(12) United States Patent
Akiyama

(10) Patent No.: US 11,681,211 B2
(45) Date of Patent: Jun. 20, 2023

(54) LIGHT SOURCE APPARATUS AND PROJECTOR

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 17/691,208

(22) Filed: Mar. 10, 2022

(65) Prior Publication Data

US 2022/0291577 A1 Sep. 15, 2022

(30) Foreign Application Priority Data

Mar. 11, 2021 (JP) .............................. JP2021-038974

(51) Int. Cl.
*G03B 21/20* (2006.01)
*G02B 27/28* (2006.01)
*H04N 9/31* (2006.01)

(52) U.S. Cl.
CPC ....... *G03B 21/2073* (2013.01); *G02B 27/283* (2013.01); *G02B 27/286* (2013.01); *G03B 21/204* (2013.01); *G03B 21/208* (2013.01); *G03B 21/2013* (2013.01); *G03B 21/2066* (2013.01); *H04N 9/3161* (2013.01); *H04N 9/3164* (2013.01); *H04N 9/3167* (2013.01)

(58) Field of Classification Search
CPC .............. G03B 21/2073; G03B 21/283; G03B 21/286; G03B 21/2013; G03B 21/204; G03B 21/2066; G03B 21/208; H04N 9/3164; H04N 9/3167

USPC ........................................................... 353/20
See application file for complete search history.

(56) References Cited

U.S. PATENT DOCUMENTS

2012/0008098 A1* 1/2012 Akiyama .............. F21S 41/148
353/30
2020/0314397 A1 10/2020 Akiyama

FOREIGN PATENT DOCUMENTS

JP 2013-250494 A 12/2013
JP 2020-160236 A 10/2020

* cited by examiner

*Primary Examiner* — Jerry L Brooks
(74) *Attorney, Agent, or Firm* — Oliff PLC

(57) ABSTRACT

A light source apparatus according to the present disclosure includes a first light source including a plurality of first light emitters arranged in a single row along a first direction, a second light source including a plurality of second light emitters arranged in a single row along a second direction, and a polarization combiner. The polarization combiner transmits the first luminous flux from the first light source and reflects the second luminous flux from the second light source. In an imaginary plane perpendicular to the center axis of the combined luminous flux, the direction in which the plurality of first beams are arranged in the single row and the direction in which the plurality of second beams are arranged in the single row intersect with each other, and the first luminous flux and the second luminous flux partially overlap with each other.

8 Claims, 15 Drawing Sheets

LIGHT SOURCE APPARATUS AND PROJECTOR

The present application is based on, and claims priority from JP Application Serial Number 2021-038974, filed Mar. 11, 2021, the disclosure of which is hereby incorporated by reference herein in its entirety.

BACKGROUND

1. Technical Field

The present disclosure relates to a light source apparatus and a projector.

2. Related Art

There is a known projector that modulates the light outputted from a light source to generate image light based on image information and projects the generated image light. JP-A-2020-160236 discloses a projector including a light source apparatus and a light modulator formed of a single liquid crystal panel. In the projector, blue, red, and two green beams polarized in the same direction are outputted from the light source apparatus, spatially separated from one another by a microlens array provided on the light incident side of the liquid crystal panel, and caused to be incident on blue, red, and two green subpixels of each of the pixels of the liquid crystal panel.

To achieve what is called a single-plate projector, a projector including a single liquid crystal panel having pixels each formed of a plurality of sub-pixels that modulate color beams different from one another as described above, the configuration described in JP-A-2020-160236 causes an increase in the size of the light source apparatus, resulting in a difficulty reducing the size of the projector. The same problem described above occurs when a projector including a plurality of liquid crystal panels is to be achieved.

SUMMARY

To solve the problem described above, a light source apparatus according to an aspect of the present disclosure includes a first light source that includes a plurality of first light emitters arranged in a single row along a first direction and outputs a first luminous flux containing a plurality of first beams emitted from the plurality of first light emitters, a second light source that includes a plurality of second light emitters arranged in a single row along a second direction that intersects with the first direction and outputs a second luminous flux containing a plurality of second beams emitted from the plurality of second light emitters, and a polarization combiner that combines the first luminous flux and the second luminous flux with each other and outputs a combined luminous flux. The plurality of first beams are arranged in a single row along the first direction in an optical path of the first luminous flux between the first light source and the polarization combiner. The first luminous flux is a luminous flux having a first polarization direction with respect to the polarization combiner. The plurality of second beams are arranged in a single row along the second direction in an optical path of the second luminous flux between the second light source and the polarization combiner. The second luminous flux is a luminous flux having a second polarization direction, different from the first polarization direction, with respect to the polarization combiner. The polarization combiner transmits the first luminous flux having the first polarization direction and reflects the second luminous flux having the second polarization direction. In an imaginary plane perpendicular to a center axis of the combined luminous flux, a direction in which the plurality of first beams are arranged in the single row and a direction in which the plurality of second beams are arranged in the single row intersect with each other, and the first luminous flux and the second luminous flux partially overlap with each other.

A projector according to another aspect of the present disclosure includes the light source apparatus according to the aspect of the present disclosure, a light modulator that modulates light outputted from the light source apparatus in accordance with image information, and a projection optical apparatus that projects the light modulated by the light modulator.

DESCRIPTION OF EXEMPLARY EMBODIMENTS

First Embodiment

A first embodiment of the present disclosure will be described below with reference to the drawings.

A projector according to the first embodiment is an example of a liquid crystal projector including an illuminator and three light modulators.

The projector will be specifically described below with reference to the drawings. In the following drawings, components are drawn at different dimensional scales in some cases for clarification of each of the components.

Figure 1:
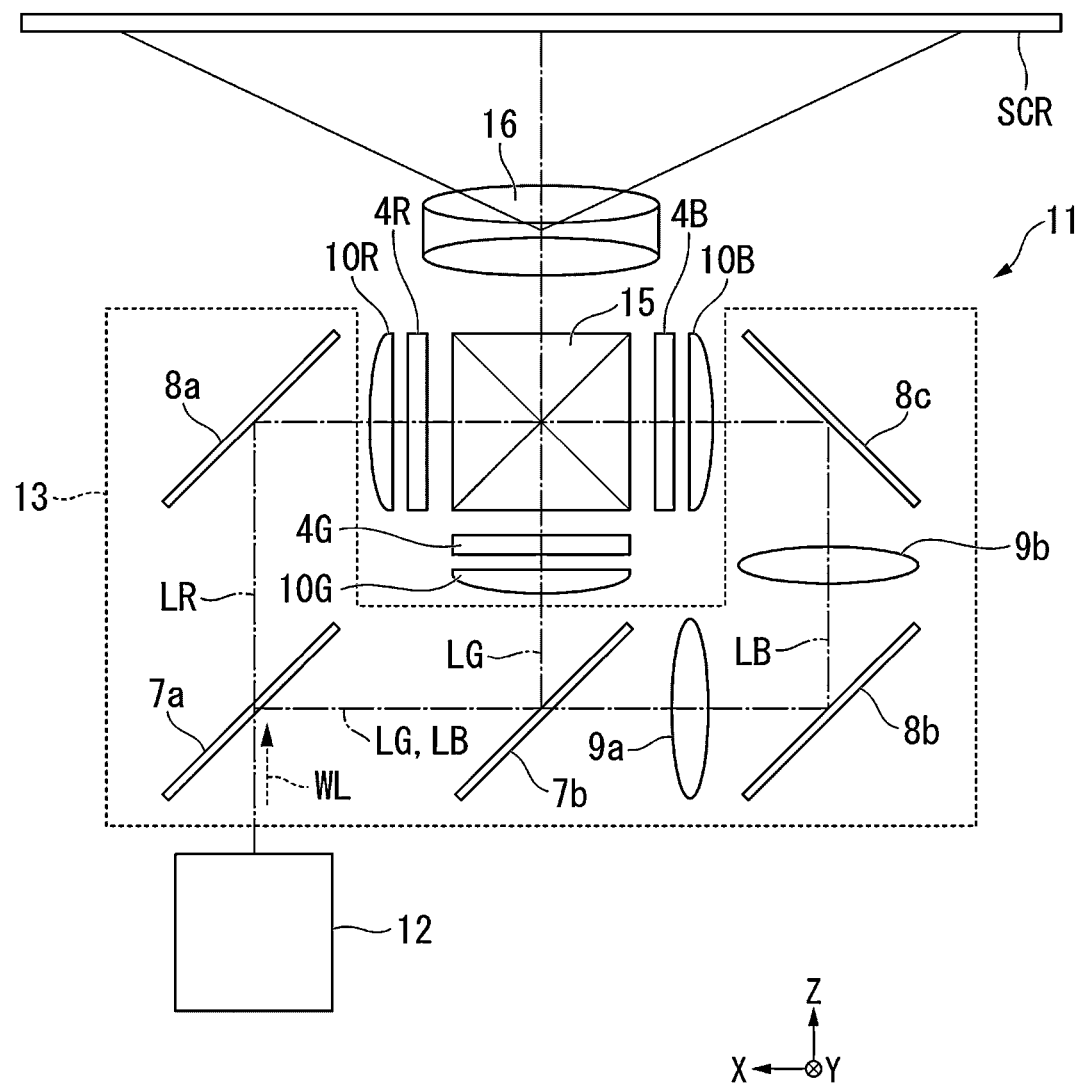
FIG. 1 is a schematic configuration diagram of a projector according to a first embodiment.

A projector 11 according to the present embodiment is a projection-type image display apparatus that displays a color image on a screen SCR, as shown in FIG. 1. The projector 11 uses three light modulators 4B, 4G, and 4R corresponding to red light LR, green light LG, and blue light LB, respectively. The projector 11 uses a semiconductor laser, which can produce high-luminance, high-power light, as the light source of an illuminator 12.

The projector 11 includes the illuminator 12, a color separation system 13, the light modulator 4R for red light, the light modulator 4G for green light, and the light modulator 4B for blue light, a light combining system 15, and a projection optical apparatus 16.

The illuminator 12 outputs illumination light WL having a uniform illuminance distribution toward the color separation system 13. The illuminator 12 is formed of a light source apparatus that is an embodiment of the present disclosure.

The color separation system 13 separates the illumination light WL outputted from the illuminator 12 into the red light LR, the green light LG, and the blue light LB. The color separation system 13 includes a first dichroic mirror 7a, a second dichroic mirror 7b, a first reflection mirror 8a, a second reflection mirror 8b, a third reflection mirror 8c, a first relay lens 9a, and a second relay lens 9b.

The first dichroic mirror 7a has the function of separating the illumination light WL outputted from the illuminator 12 into the red light LR and light containing the green light LG and the blue light LB. The first dichroic mirror 7a transmits the red light LR and reflects the green light LG and the blue light LB. The second dichroic mirror 7b has the function of separating the light reflected off the first dichroic mirror 7a into the green light LG and the blue light LB. The second dichroic mirror 7b reflects the green light LG and transmits the blue light LB.

The first reflection mirror 8a is disposed in the optical path of the red light LR. The first reflection mirror 8a reflects the red light LR having passed through the first dichroic mirror 7a toward the light modulator 4R for red light. The second reflection mirror 8b and the third reflection mirror 8c are disposed in the optical path of the blue light LB. The second reflection mirror 8b and the third reflection mirror 8c reflect the blue light LB having passed through the second dichroic mirror 7b toward the light modulator 4B for blue light. The green light LG is reflected off the second dichroic mirror 7b and travels toward the light modulator 4G for green light.

The first relay lens 9a and the second relay lens 9b are disposed in the optical path of the blue light LB on the light exiting side of the second dichroic mirror 7b. The first relay lens 9a and the second relay lens 9b compensate for optical loss of the blue light LB resulting from the fact that the optical path length of the blue light LB is longer than the optical path lengths of the red light LR and the green light LG.

The light modulator 4R for red light modulates the red light LR in accordance with image information to form image light corresponding to the red light LR. The light modulator 4G for green light modulates the green light LG in accordance with image information to form image light corresponding to the green light LG. The light modulator 4B for blue light modulates the blue light LB in accordance with image information to form image light corresponding to the blue light LB.

The light modulator 4R for red light, the light modulator 4G for green light, and the light modulator 4B for blue light are each, for example, a transmissive liquid crystal panel. A pair of polarizers that are not illustrated are disposed on the light incident and exiting sides of each of the liquid crystal panels. The pair of polarizers transmit linearly polarized light polarized in a specific direction.

A field lens 10R is disposed on the light incident side of the light modulator 4R for red light. A field lens 10G is disposed on the light incident side of the light modulator 4G for green light. A field lens 10B is disposed on the light incident side of the light modulator 4B for blue light. The field lens 10R parallelizes the red light LR to be incident on the light modulator 4R for red light. The field lens 10G parallelizes the green light LG to be incident on the light modulator 4G for green light. The field lens 10B parallelizes the blue light LB to be incident on the light modulator 4B for blue light.

The light combining system 15 combines the image light corresponding to the red light LR, the image light corresponding to the green light LG, and the image light corresponding to the blue light LB with one another and outputs the combined image light toward the projection optical apparatus 16. The light combining system 15 is formed, for example, of a cross dichroic prism.

The projection optical apparatus 16 is formed of a projection lens group including a plurality of projection lenses. The projection optical apparatus 16 enlarges the combined image light from the light combining system 15 and projects the enlarged image light toward the screen SCR. An enlarged color image is thus displayed on the screen SCR.

The illuminator 12 will be descried below.

Figure 2:
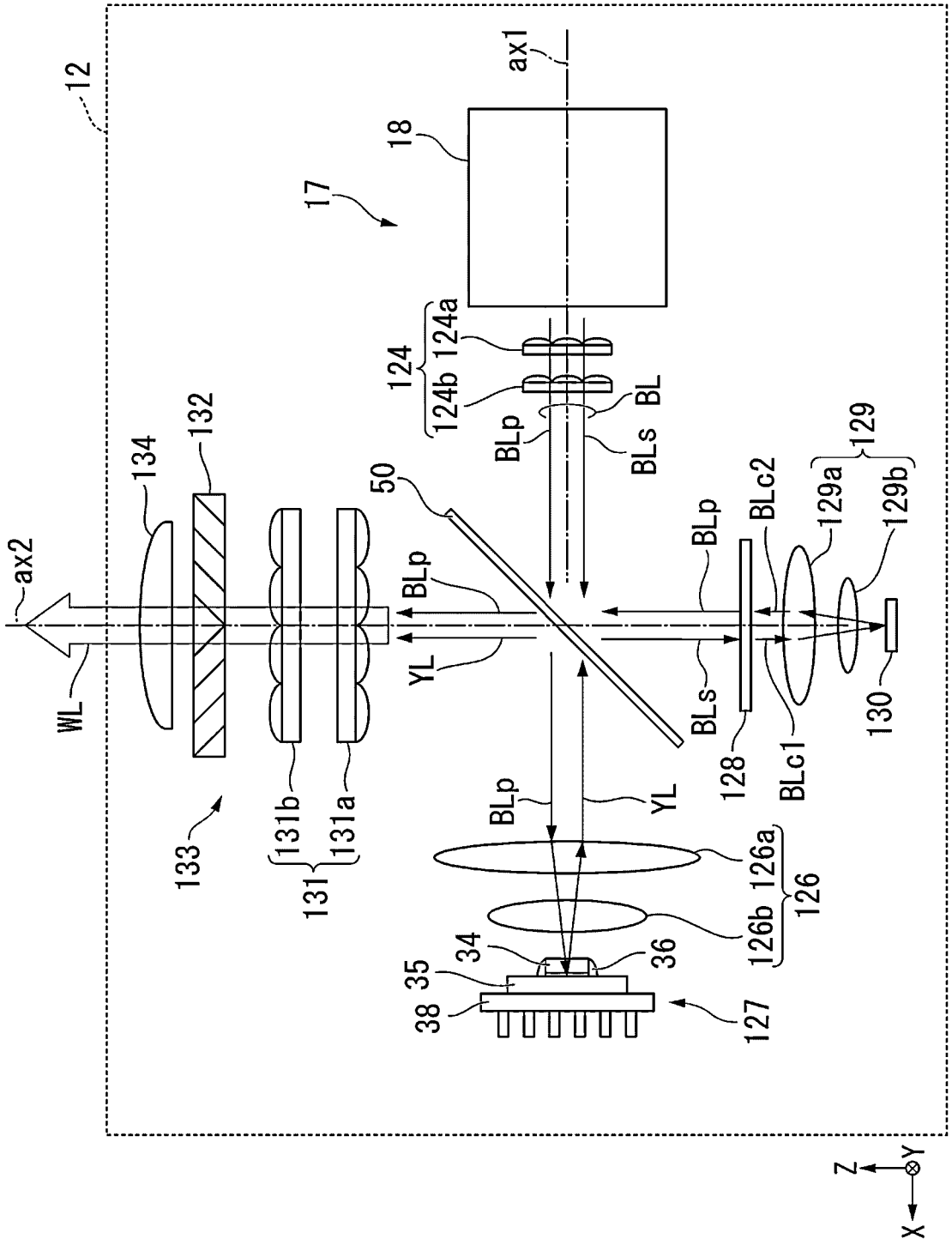
FIG. 2 is a schematic configuration diagram of an illuminator in the first embodiment.

The illuminator 12 includes a light source apparatus 17, a polarization converter 132, and a superimposing optical system 133, as shown in FIG. 2. The light source apparatus 17 includes a light source unit 18, a homogenizer optical system 124, a polarization separator 50, a first pickup optical system 126, a wavelength converter 127, a retardation film 128, a second pickup optical system 129, and a diffusive reflector 130. The superimposing optical system 133 includes an optical integration system 131 and a superimposing lens 134.

The configuration of the light source apparatus will be described below by using an XYZ orthogonal coordinate system. The center axis of blue light BL outputted from the light source unit 18 is referred to as an optical axis ax1. An axis extending along the optical axis ax1 is called an axis X, and the direction in which the blue light BL exits is called a direction +X. The center axis of the blue light BL outputted from the diffusive reflector 130 is referred to as an optical axis ax2. An axis extending along the optical axis ax2 is called an axis Z, and the direction in which the blue light BL is outputted is called a direction +Z. An axis perpendicular to the axes X and Z is called an axis Y, and one of the directions along the axis Y is called a direction +Y.

Out of the necessary components described above, the light source unit 18, the homogenizer optical system 124, the polarization separator 50, the first pickup optical system 126, and the wavelength converter 127 are arranged along the optical axis ax1. The diffusive reflector 130, the second pickup optical system 129, the retardation film 128, the polarization separator 50, the optical integration system 131, the polarization converter 132, and the superimposing lens 134 are arranged along the optical axis ax2. The optical axes ax1 and ax2 are present in the same plane and perpendicular to each other.

The light source unit 18 outputs the blue light BL formed of a plurality of beams polarized in directions different from one another. The configuration of the light source unit 18 will be described later in detail.

The blue light BL in the present embodiment corresponds to the combined luminous flux in the claims.

The blue light BL outputted from the light source unit 18 enters the homogenizer optical system 124. The homogenizer optical system 124 converts the optical intensity distribution of the blue light BL, for example, into a uniform optical intensity distribution called a top-hat distribution. The homogenizer optical system 124 is formed, for example, of a multi-lens array 124a and a multi-lens array 124b.

The blue light BL having exited out of the homogenizer optical system 124 enters the polarization separator 50. The polarization separator 50 inclines by 45° with respect to the optical axes ax1 and ax2. The polarization separator 50 separates the blue light BL into S-polarized blue light BLs and P-polarized blue light BLp with respect to the polarization separator 50. Specifically, the polarization separator 50 reflects the S-polarized light BLs and transmits the P-polarized light BLp out of the blue light BL. In the following description, the P-polarized light BLp that passes through the polarization separator 50 is used to excite a phosphor layer and is therefore referred to as excitation light BLp. The S-polarized light BLs reflected off the polarization separator 50 is used as part of the illumination light and is therefore referred to as blue light BLs.

The polarization separator 50 further reflects yellow fluorescence YL, which has a wavelength band different from that of the blue light BL outputted from the light source unit 18, irrespective of the polarization state of the fluorescence YL.

The P-polarized excitation light BLp having passed through the polarization separator 50 enters the first pickup optical system 126. The first pickup optical system 126 causes the excitation light BLp to converge toward a phosphor layer 34 of the wavelength converter 127. The first pickup optical system 126 is formed of pickup lenses 126a and 126b.

The excitation light BLp having exited out of the first pickup optical system 126 enters the wavelength converter 127. The wavelength converter 127 includes the phosphor layer 34 and a substrate 35, which supports the phosphor layer 34. When the excitation light BLp enters the phosphor layer 34, a phosphor contained in the phosphor layer 34 is excited, and the yellow fluorescence YL having a wavelength band different from that of the excitation light BLp is generated.

In the wavelength converter 127, the phosphor layer 34 is fixed to the substrate 35 with an adhesive 36 provided between the side surface of the phosphor layer 34 and the substrate 35 with the surface of the phosphor layer 34 different from the surface on which the excitation light BLp is incident being in contact with the substrate 35. A heat sink 38, which dissipates the heat of the phosphor layer 34, is provided at the surface of the substrate 35 different from the surface at which the phosphor layer 34 is provided.

The fluorescence YL emitted from the phosphor layer 34, which is unpolarized light having polarization directions not aligned with one another, passes through the first pickup optical system 126 and then enters as the unpolarized light the polarization separator 50. The fluorescence YL is reflected off the polarization separator 50 and travels toward the optical integration system 131.

On the other hand, the S-polarized blue light BLs reflected off the polarization separator 50 enters the retardation film 128. The retardation film 128 is formed of a quarter wave plate disposed in the optical path between the polarization separator 50 and the diffusive reflector 130. The S-polarized blue light BLs having exited out of the polarization separator 50 is therefore converted by the retardation film 128 into circularly polarized blue light BLc1, which then enters the second pickup optical system 129.

The second pickup optical system 129 causes the blue light BLc1 to converge toward the diffusive reflector 130. The second pickup optical system 129 is formed of pickup lenses 129a and 129b.

The diffusive reflector 130 diffusively reflects the blue light BLc1 having exited out of the second pickup system 129 toward the polarization separator 50. The diffusive reflector 130 is in particular preferably a diffusive reflector that reflects the blue light BLc1 incident thereon in the Lambertian reflection scheme. Using a diffusive reflector 130 of this type in the illuminator 12 allows generation of blue light BLc2 having a uniform illuminance distribution as well as diffusive reflection of the blue light BLc1.

The blue light BLc2 diffusively reflected off the diffusive reflector 130 is converted from the circularly polarized blue light BLc2 into the P-polarized blue light BLp when entering the retardation film 128 again, as shown in FIG. 2. The P-polarized blue light BLp passes through the polarization separator 50 and travels toward the optical integration system 131.

The blue light BLp is thus used along with the fluorescence YL reflected off the polarization separator 50 as the illumination light WL. That is, the blue light BLp and the fluorescence YL exit out of the polarization separator 50 in the same direction. White illumination light WL, which is the combination of the blue light BLp and the yellow fluorescence YL, is thus produced. That is, the polarization separator 50 also functions as a light combiner that combines the blue light BLp and the fluorescence YL with each other.

The illumination light WL having exited out of the polarization separator 50 enters the optical integration system 131. The optical integration system 131 divides the illumination light WL into a plurality of thin luminous fluxes. The optical integration system 131 is formed of a first lens array 131a and a second lens array 131b. The first lens array 131a and the second lens array 131b are each formed of a plurality of microlenses arranged in an array.

The illumination light WL having exited out of the optical integration system 131 enters the polarization converter 132. The polarization converter 132 aligns the polarization directions of the illumination light WL with one another. The polarization converter 132 is formed of polarization separation films and retardation films. To align the polarization directions of the unpolarized fluorescence YL with the polarization direction of the P-polarized blue light BLp, the polarization converter 132 converts one polarization component into the other polarization component, for example, the S-polarized light component into the P-polarized light component.

The illumination light WL having passed through the polarization converter 132 and therefore having an aligned polarization direction enters the superimposing lens 134. The superimposing lens 134 superimposes the plurality of thin luminous fluxes having exited out of the polarization converter 132 onto each other on a target object to be illuminated. The object to be illuminated can thus be uniformly illuminated. The superimposing optical system 133 is formed of the optical integration system 131 and the superimposing lens 134.

The light source unit 18 will be descried below.

Figure 3:
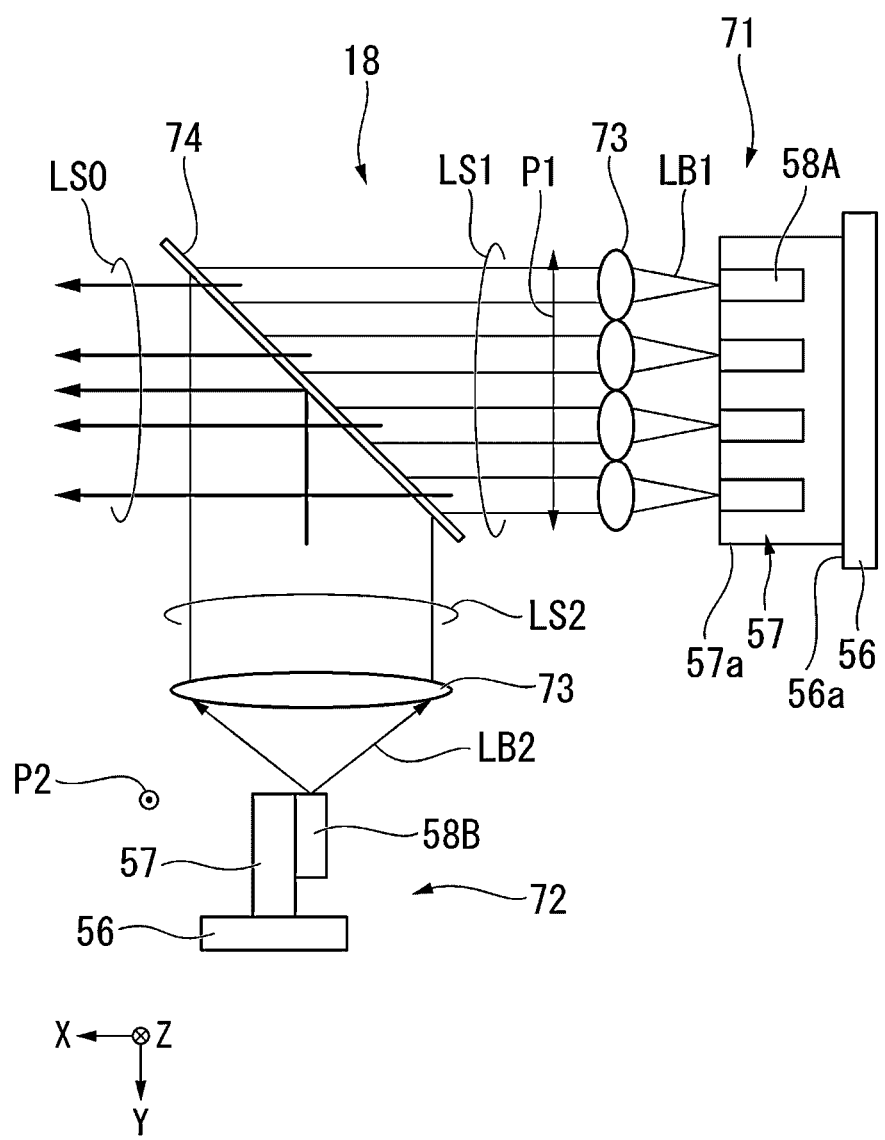
FIG. 3 is a plan view of a light source unit.

FIG. 3 is a plan view of the light source unit 18 viewed from the negative side of the direction Z.

The light source unit 18 includes a first light source 71, a second light source 72, a plurality of collimator lenses 73, and a polarization combiner 74, as shown in FIG. 3.

Figure 4:
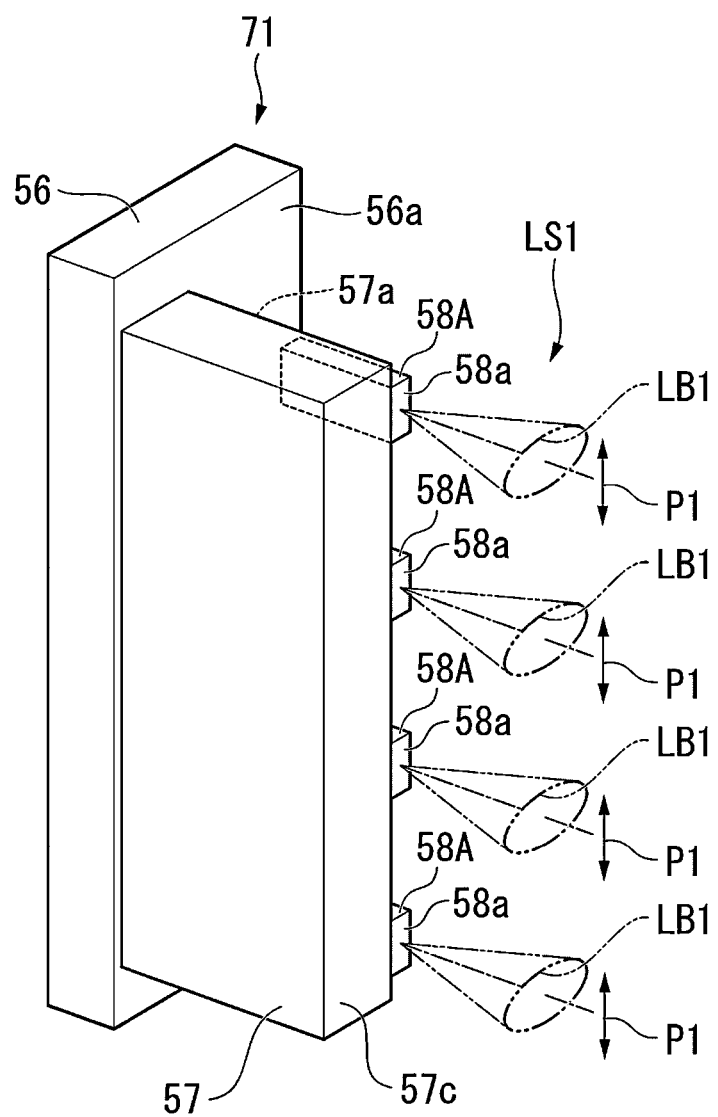
FIG. 4 is a perspective view of a first light source.

FIG. 4 is a perspective view of the first light source 71. The first light source 71 and the second light source 72 have the same configuration, and the first light source 71 will therefore be described below by way of example. In FIG. 4, the plurality of collimator lenses 73 are omitted for clarity of the figure.

The first light source 71 includes a substrate 56, a support member 57, and a plurality of first light emitters 58A, as shown in FIG. 4.

The substrate 56 is made of a metal material that excels in heat dissipation, for example, aluminum or copper. The support member 57 is provided at a first surface 56a of the substrate 56. The support member 57 is made of a metal material that excels in heat dissipation, for example, aluminum or copper, as the substrate 56 is. The support member 57 has a mounting surface 57a, on which the plurality of first light emitters 58A are mounted. The mounting surface 57a has a rectangular shape having a lengthwise direction and a widthwise direction when viewed in the direction of a normal to the mounting surface 57a.

The plurality of first light emitters 58A are arranged at intervals on the mounting surface 57a of the support member 57 along the lengthwise direction of the mounting surface 57a. In the present embodiment, the first light source 71 includes four first light emitters 58A arranged in a single row along the axis-Y direction. The four first light emitters 58A each emit a beam LB1. The direction in which the beam LB1 is emitted is the direction along the chief ray of the beam LB1.

The axis-Y direction in the present embodiment corresponds to the first direction in the claims. The beams LB1 in the present embodiment correspond to the first beam in the claims.

The plurality of first light emitters 58A are each mounted on the support member 57. The plurality of first light emitters 58A each have a rectangular light emitting surface 58a. The light emitting surfaces 58a are located substantially flush with an end surface 57c facing the long sides of the support member 57.

The direction in which the beam LB1 emitted from each of the first light emitters 58A exits coincides with the widthwise direction of the support member 57. The direction in which the plurality of first light emitters 58A are arranged intersects with the direction in which the beams LB1 exit. A cross section of the beam LB1 emitted from each of the first light emitters 58A, the cross section perpendicular to the chief ray of the beam LB1, has an elliptical shape. The direction of the minor axis of the elliptical shape coincides with the lengthwise direction (axis-Y direction) of the light emitting surface 58a and further coincides with the direction in which the plurality of first light emitters 58a are arranged. The direction of the major axis of the elliptical shape coincides with the widthwise direction (axis-Z direction) of the light emitting surface 58a. A polarization direction P1 of each of the beams LB1 coincides with the direction of the minor axis of the elliptical shape.

The plurality of first light emitters 58A are each formed of a blue semiconductor laser that outputs blue light. The blue semiconductor laser outputs blue light having a peak wavelength that falls within, for example, a wavelength band ranging from 380 to 495 nm. The first light source 71 therefore outputs a first luminous flux LS1 containing four beams LB1 arranged in the axis-Y direction. That is, an entire beam containing the four beams emitted from the four first light emitters 58A is referred to as the luminous flux LS1.

The second light source 72 includes four second light emitters 58B arranged in a single row along the axis-Z direction, as the first light source 71 does, as shown in FIG. 3. The four second light emitters 58B each emit a beam LB2. The second light source 72 outputs a second luminous flux LS2 containing four beams LB2 arranged in the axis-Z direction.

The direction axis-Z in the present embodiment corresponds to the second direction in the claims. The beams LB2 in the present embodiment correspond to the second beam in the claims.

In the first light source 71, the four first light emitters 58A are arranged in a single row along the axis-Y direction, as shown in FIG. 3. The four beams LB1 are arranged in a single row along the axis-Y direction in the optical path of the first luminous flux LS1 between the first light source 71 and the polarization combiner 74. In the second light source 72, the four second light emitters 58B are arranged along the axis-Z direction. The four beams LB2 are arranged in a single row along the axis-Z direction in the optical path of the second luminous flux LS2 between the second light source 72 and the polarization combiner 74.

The direction in which the four light emitters 58A are arranged in the first light source 71 differs from the direction in which the four light emitters 58B are arranged in the second light source 72. Furthermore, the axis-Y direction and the axis-Z direction intersect with each other. The polarization direction P1 of the first luminous flux LS1 outputted from the first light source 71 and a polarization direction P2 of the second luminous flux LS2 outputted from the second light source 72 differ from each other. The first luminous flux LS1 is a P-polarized luminous flux with respect to the polarization combiner 74. The second luminous flux LS2 is an S-polarized luminous flux with respect to the polarization combiner 74.

The P-polarized luminous flux in the present embodiment corresponds to the luminous flux polarized in the first polarization direction in the claims. The S-polarized luminous flux in the present embodiment corresponds to the luminous flux polarized in the second polarization direction in the claims.

The polarization combiner 74 is provided at the intersection of the optical path of the first luminous flux LS1 and the optical path of the second luminous flux LS2. The polarization combiner 74 is so disposed as to incline by an angle of 45° with respect to each of the optical path of the first luminous flux LS1 and the optical path of the second luminous flux LS2. The polarization combiner 74 transmits the first luminous flux LS1, which is a P-polarized luminous flux, and reflects the second luminous flux LS2, which is an S-polarized luminous flux. The polarization combiner 74 thus combines the first luminous flux LS1 and the second luminous flux LS2 with each other and outputs a combined luminous flux LS0.

Figure 5A:
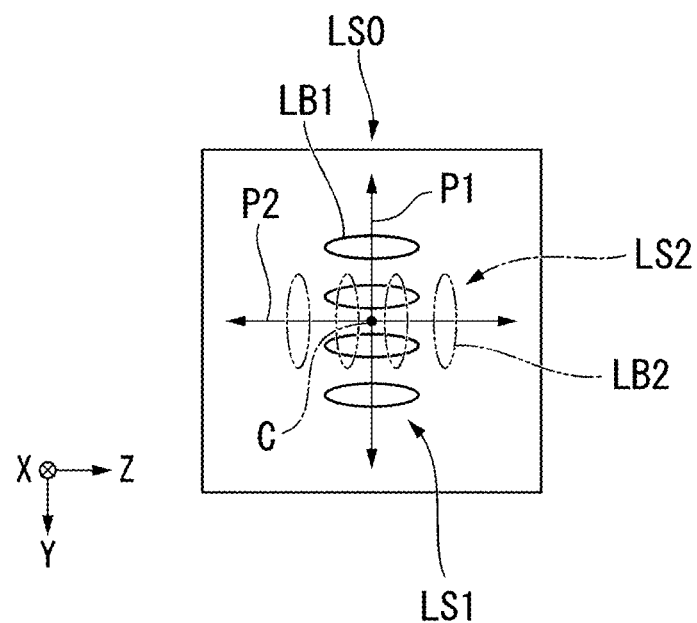
FIG. 5A is a diagrammatic view showing a cross-sectional shape of a combined luminous flux in a light source apparatus according to the embodiment.

FIG. 5A is a diagrammatic view showing a cross-sectional shape of the combined luminous flux LS0 outputted from the polarization combiner 74. FIG. 5A shows the cross-sectional shape of the combined luminous flux LS0 in an imaginary plane (plane YZ) perpendicular to the center axis of the combined luminous flux LS0.

In the imaginary plane perpendicular to a center axis C of the combined luminous flux LS0, the first luminous flux LS1 is formed of the four beams LB1 arranged at intervals in the axis-Y direction, as shown in FIG. 5A. The second luminous flux LS2 is formed of the four beams LB2 arranged at intervals in the axis-Z direction. The first luminous flux LS1 and the second luminous flux LS2 intersect with each other. That is, the direction (axis-Y direction) in which the four beams LB1 are arranged in a single row and the direction (axis-Z direction) in which the four beams LB2 are arranged in a single row intersect with each other. Part of the first luminous flux LS1 and part of the second luminous flux LS2 overlap with each other. Specifically, the central two of the four beams LB1 of the first luminous flux LS1 and the central two of the four beams LB2 of the second luminous flux LS2 overlap with each other. In the imaginary plane perpendicular to the center axis C of the combined luminous flux LS0, the cross-sectional shape of the combined luminous flux LS0 is rotationally symmetric with respect to the center axis C of the combined luminous flux LS0.

For each of the beams LB1, which form the first luminous flux LS1, the minor axis of the elliptical shape of the beam LB1 that is the cross-sectional shape thereof perpendicular to the direction in which the beam LB1 exits extends in the direction in which the beams LB1 are arranged (axis-Y direction). For each of the beams LB2, which form the second luminous flux LS2, the minor axis of the elliptical shape of the beam LB2 that is the cross-sectional shape thereof perpendicular to the direction in which the beam LB2 exits extends in the direction in which the beams LB2 are arranged (axis-Z direction). The polarization state of the combined luminous flux LS0 is therefore a mixture of two polarization directions P1 and P2 perpendicular to each other in an imaginary plane perpendicular to the center axis C of the combined luminous flux LS0.

The combined luminous flux LS0 is thus separated by the polarization separator 50 shown in FIG. 2 into two luminous fluxes, with one luminous flux being incident on the diffusive reflector 130 and the other luminous flux being incident on the wavelength converter 127. The two separate luminous fluxes from the polarization separator 50 each have the cross-sectional shape shown in FIG. 5A.

Alight source in which a plurality of semiconductor lasers are mounted on a single substrate has an advantage of achieving a highly efficient, compact light source apparatus, as shown in FIG. 4, and has been widely used in recent years. Use of a single light source of this type, however, causes insufficient luminance in some cases as the light source of a projector. It is therefore conceivable to improve the luminance by combining two luminous fluxes outputted from two light sources with each other into a combined luminous flux.

To combine two luminous fluxes, several conceivable forms are conceivable.

Figure 6A:
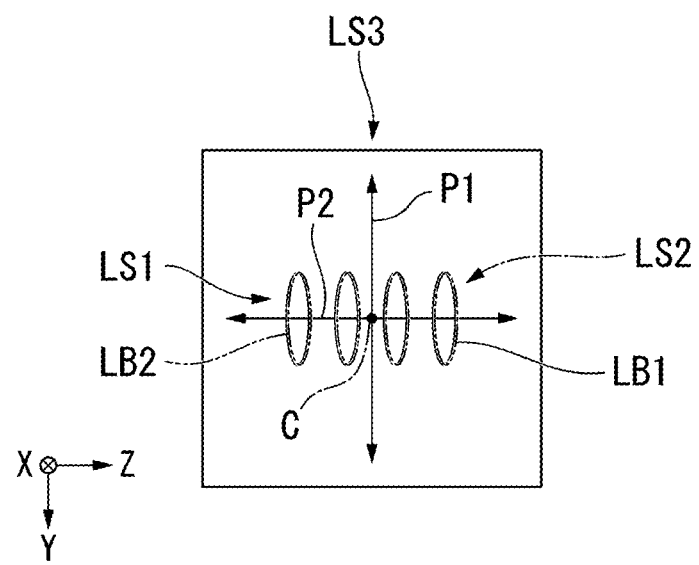
FIG. 6A is a diagrammatic view showing the cross-sectional shape of the combined luminous flux in the light source apparatus according to Comparable Example 1.

FIG. 6A is a diagrammatic view showing the cross-sectional shape of a combined luminous flux LS3 in a light source apparatus according to Comparable Example 1.

In the light source apparatus according to Comparative Example 1, the first luminous flux LS1 and the second luminous flux LS2 are so disposed that the four beams LB1 and LB2, which form the two luminous fluxes, are completely superimposed on each other, as shown in FIG. 6A. In Comparative Example 1, to combine the first luminous flux LS1 and the second luminous flux LS2 with each other by using a polarization combiner, as in the present embodiment, a half wave plate is interposed in either the optical path of the first luminous flux LS1 or the optical path of the second luminous flux LS2 to cause the polarization direction of the first luminous flux LS1 and the polarization direction of the second luminous flux LS2 to differ from each other. The polarization state of the combined luminous flux LS3 is therefore a mixture of the two polarization directions P1 and P2 perpendicular to each other in an imaginary plane perpendicular to the center axis C of the combined luminous flux LS3.

In the light source apparatus according to Comparative Example 1, the combined luminous flux LS3 formed of the plurality of beams LB1 arranged in a single row in the axis-Z direction is incident on the diffusive reflector. The present inventor conducted a simulation on the intensity distribution of the diffused light outputted from the diffusive reflector in the light source apparatus according to Comparative Example 1.

Figure 6B:
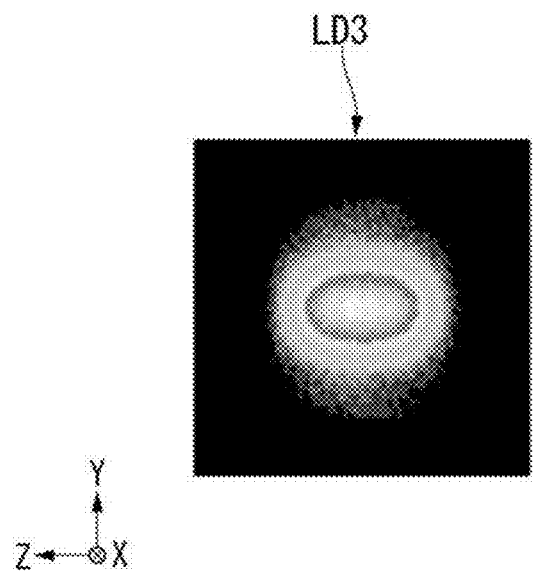
FIG. 6B shows the intensity distribution of diffused light from the diffusive reflector.

FIG. 6B shows the intensity distribution of diffused light LD3 from the diffusive reflector in Comparative Example 1.

In Comparative Example 1, the intensity distribution of the diffused light LD3 has an elliptical shape having a major axis and a minor axis that intersect with each other, as shown in FIG. 6B.

Figure 7A:
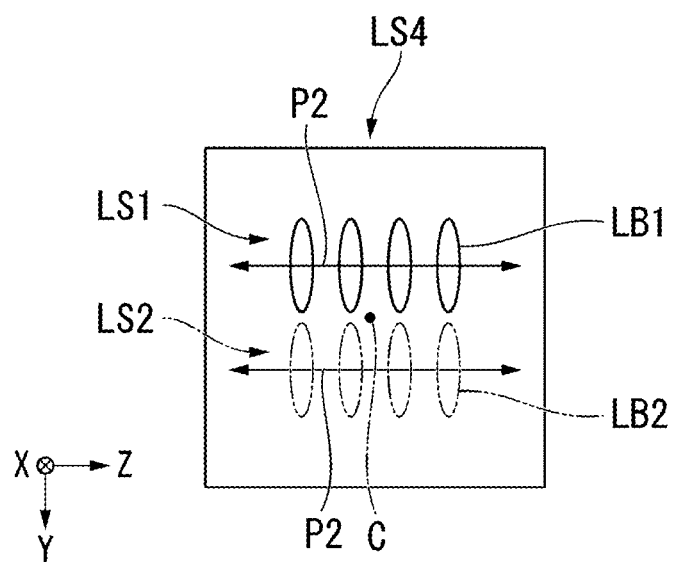
FIG. 7A is a diagrammatic view showing the cross-sectional shape of the combined luminous flux in the light source apparatus according to Comparable Example 2.

FIG. 7A is a diagrammatic view showing the cross-sectional shape of a combined luminous flux LS4 in a light source apparatus according to Comparable Example 2.

In the light source apparatus according to Comparative Example 2, the first luminous flux LS1 and the second luminous flux LS2 are separate from each other and so disposed in parallel to the axis Z that the four beams LB1 and LB2, which form the luminous fluxes, are arranged in the same direction, as shown in FIG. 7A. In Comparative Example 2, the first luminous flux LS1 and the second luminous flux LS2 are combined with each other by using, for example, a total reflection mirror, without using a polarization combiner. In this case, the polarization direction of the first luminous flux LS1 and the polarization direction of the second luminous flux LS2 coincide with each other because there is no need to use a half wave plate, unlike in the light source apparatus according to Comparative Example 1. The polarization state of the combined luminous flux LS4 therefore has only the polarization direction P2, unlike in the present embodiment and Comparative Example 1.

The present inventor conducted a simulation on the intensity distribution of the diffused light outputted from the diffusive reflector also in the light source apparatus according to Comparative Example 2.

Figure 7B:
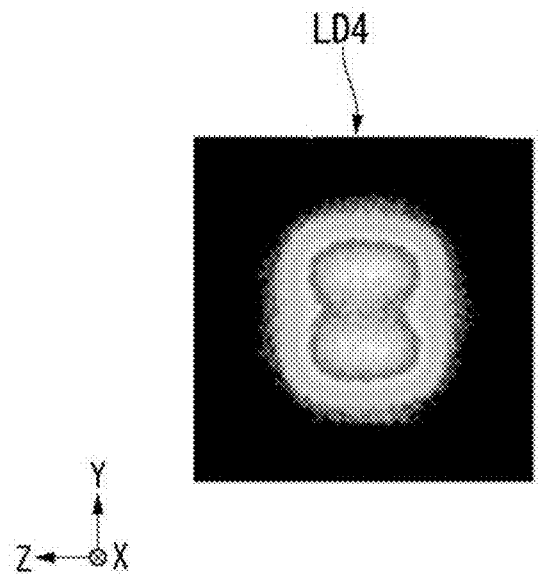
FIG. 7B shows the intensity distribution of diffused light from the diffusive reflector.

FIG. 7B shows the intensity distribution of diffused light LD4 from the diffusive reflector in Comparative Example 2.

In Comparative Example 2, the intensity distribution of the diffused light LD4 has a shape formed of two ellipses arranged in the minor axes thereof, as shown in FIG. 7B.

In the light source apparatuses according to Comparative Examples 1 and 2, the diffused light LD3 and the diffused light LD4 outputted from the diffusive reflectors each have a low symmetric intensity distribution, as shown in FIGS. 6B and 7B. As a result, there is a problem of a decrease in the uniformity in a uniform illumination system formed of a downstream lens integrator in each of the light source apparatuses.

When white light is generated by combining the diffused light from the diffusive reflector and the fluorescence from the wavelength converter with each other, as in the present embodiment, the fluorescence is isotropically emitted from the phosphor layer in the Lambertian scheme, so that the intensity distribution of the fluorescence has a substantially circular shape around the position on which the chief ray of the excitation light is incident. It is therefore desirable that the shape of the intensity distribution of the diffused light is close to a circular shape, and when the intensity distribution of the diffused light deviates from a circular shape, color unevenness of the white light undesirably occurs.

The present inventor conducted a simulation on the intensity distribution of the diffused light outputted from the diffusive reflector 130 in the light source apparatus 17 according to the present disclosure.

Figure 5B:
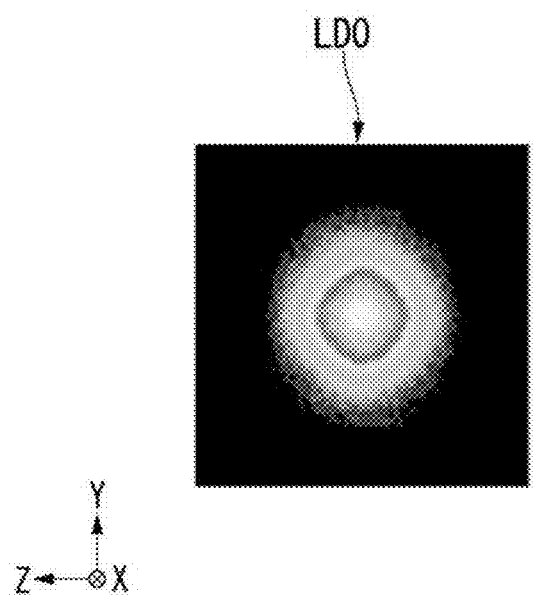
FIG. 5B shows the intensity distribution of diffused light from a diffusive reflector.

FIG. 5B shows the intensity distribution of diffused light LD0 from the diffusive reflector 130 in the present embodiment.

The intensity distribution of the diffused light LD0 in the present embodiment has a shape closer to a circular shape as compared with those in Comparative Examples 1 and 2. In the present embodiment, in particular, the diffusive reflector 130 has a diffusion characteristic that allows the full width at half maximum to be greater than or equal to 60°. The scattering performed by the diffusive reflector 130 is therefore close to Lambertian scattering.

Effects of First Embodiment

The light source apparatus 17 according to the present embodiment includes the first light source 71, which includes the plurality of first light emitters 58A arranged in a single row along the axis-Y direction and outputs the first luminous flux LS1 containing the plurality of beams LB1 emitted from the plurality of first light emitters 58A, the second light source 72, which includes the plurality of second light emitters 58B arranged in a single row along the axis-Z direction, which intersects with the axis-Y direction, and outputs the second luminous flux LS2 containing the plurality of beams LB2 emitted from the plurality of second light emitters 58B, and the polarization combiner 74, which combines the first luminous flux LS1 and the second luminous flux LS2 with each other and outputs the combined luminous flux LS0. The plurality of beams LB1 are arranged in a single row along the axis-Y direction in the optical path of the first luminous flux LS1 between the first light source 71 and the polarization combiner 74. The first luminous flux LS1 is a P-polarized luminous flux with respect to the polarization combiner 74. The plurality of beams LB2 are arranged in a single row along the axis-Z direction in the optical path of the second luminous flux LS2 between the second light source 72 and the polarization combiner 74. The second luminous flux LS2 is an S-polarized luminous flux with respect to the polarization combiner 74. The polarization combiner 74 transmits a P-polarized luminous flux and reflects an S-polarized luminous flux. In an imaginary plane perpendicular to the center axis C of the combined luminous flux LS0, the direction in which the plurality of beams LB1 are arranged in a single row and the direction in which the plurality of beams LB2 are arranged in a single row intersect with each other, and part of the first luminous flux LS1 and part of the second luminous flux LS2 overlap with each other.

According to the configuration described above, the combined luminous flux LS0 has a highly symmetric intensity distribution, whereby a compact light source apparatus 17 can be achieved, as described above. The light source apparatus 17 according to the present embodiment further includes the diffusive reflector 130, which diffuses part of the combined luminous flux LS0, and the wavelength converter 127, which converts the other part of the combined luminous flux LS0 in terms of wavelength, whereby white illumination light WL having a small degree of color unevenness can be provided.

In the light source apparatus 17 according to the present embodiment, the diffusive reflector 130 has the diffusion characteristic that allows the full width at half maximum to be greater than or equal to 60°.

According to the configuration described above, the scattering performed by the diffusive reflector 130 is close to Lambertian scattering, whereby the color unevenness of the illumination light WL can be further suppressed.

The light source apparatus 17 according to the present embodiment further includes the retardation film 128, which is provided between the polarization separator 50 and the diffusive reflector 130, on which the excitation light BLs having exited out of the polarization separator 50 is incident, and on which the blue light BLc1 diffused by the diffusive reflector 130 is incident.

According to the configuration described above, the retardation film 128 can convert the polarization direction of the blue light BLc1 diffused by the diffusive reflector 130, so that the blue light BLc1 can pass through the polarization separator 50 and can be combined with the fluorescent YL. The blue light BLc1 diffused by the diffusive reflector 130 can thus be used more efficiently.

The projector 11 according to the present embodiment includes the light source apparatus 17, the light modulators 4B, 4G, and 4R, which modulate the light from the light source apparatus 17 in accordance with image information, and the projection optical apparatus 16, which projects the light modulated by the light modulators 4B, 4G, and 4R.

According to the configuration described above, a highly efficient, compact projector 11 can be achieved.

Second Embodiment

A second embodiment of the present disclosure will be described below with reference to the drawings.

Figure 8:
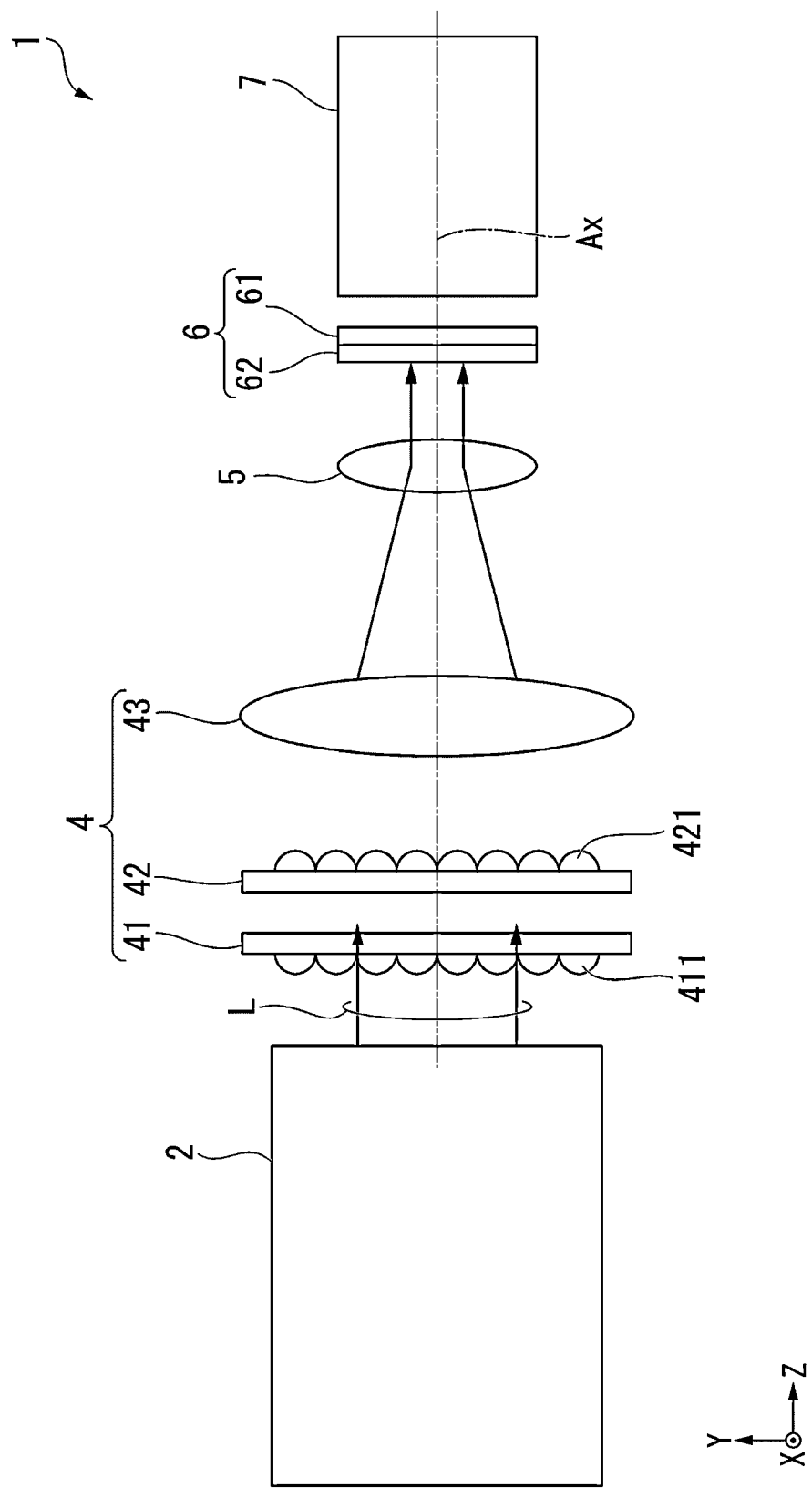
FIG. 8 is a schematic configuration diagram of the projector according to a second embodiment.

FIG. 8 is a schematic configuration diagram of a projector 1 according to the second embodiment.

In the following drawings, the same reference numerals are attached to the components common to the drawings used in the first embodiment and the descriptions are omitted.

The projector 1 according to the second embodiment, in which a single light modulator 6 including a single liquid crystal panel 61 modulates the light outputted from a light source apparatus 2 to form an image, projects the formed image. The projector 1 is what is called a single-panel projector.

The projector 1 includes the light source apparatus 2, a homogenizer 4, a field lens 5, the light modulator 6, and a projection optical apparatus 7, as shown in FIG. 8. The light source apparatus 2, the homogenizer 4, the field lens 5, the light modulator 6, and the projection optical apparatus 7 are disposed in predetermined positions along an illumination optical axis Ax. The illumination optical axis Ax is defined as an axis extending along the traveling direction of the chief ray of light L outputted from the light source apparatus 2.

The configurations of the light source apparatus 2 and the homogenizer 4 will be described later in detail.

The field lens 5 is disposed between the homogenizer 4 and the light modulator 6. The field lens 5 parallelizes the light L having exited out of the homogenizer 4 and guides the parallelized light L to the light modulator 6.

The projection optical apparatus 7 projects the light modulated by the light modulator 6, that is, image forming light onto a projection receiving surface (not shown), such as a screen. The projection optical apparatus 7 includes a single projection lens or a plurality of projection lenses.

In the following description, an axis parallel to the direction in which the light outputted from the light source apparatus 2 travels along the illumination optical axis Ax is called an axis Z, and the light traveling direction is called a direction +Z. Two axes that are perpendicular to the axis Z and to each other are called an axis X and an axis Y. Out of the directions along the axes X, Y, and Z, the direction toward the upper side of the vertical direction in the space where the projector 1 is installed is called a direction +Y. The direction toward the right side of the horizontal direction is called a direction +X when a target object on which light is incident along the direction +Z is so viewed that the direction +Y is oriented toward the upper side of the vertical direction. Although not shown, the direction opposite the direction +X is a direction −X, the direction opposite the direction +Y is a direction −Y, and the direction opposite the direction +Z is a direction −Z.

Configuration of Light Source Apparatus

Figure 9:
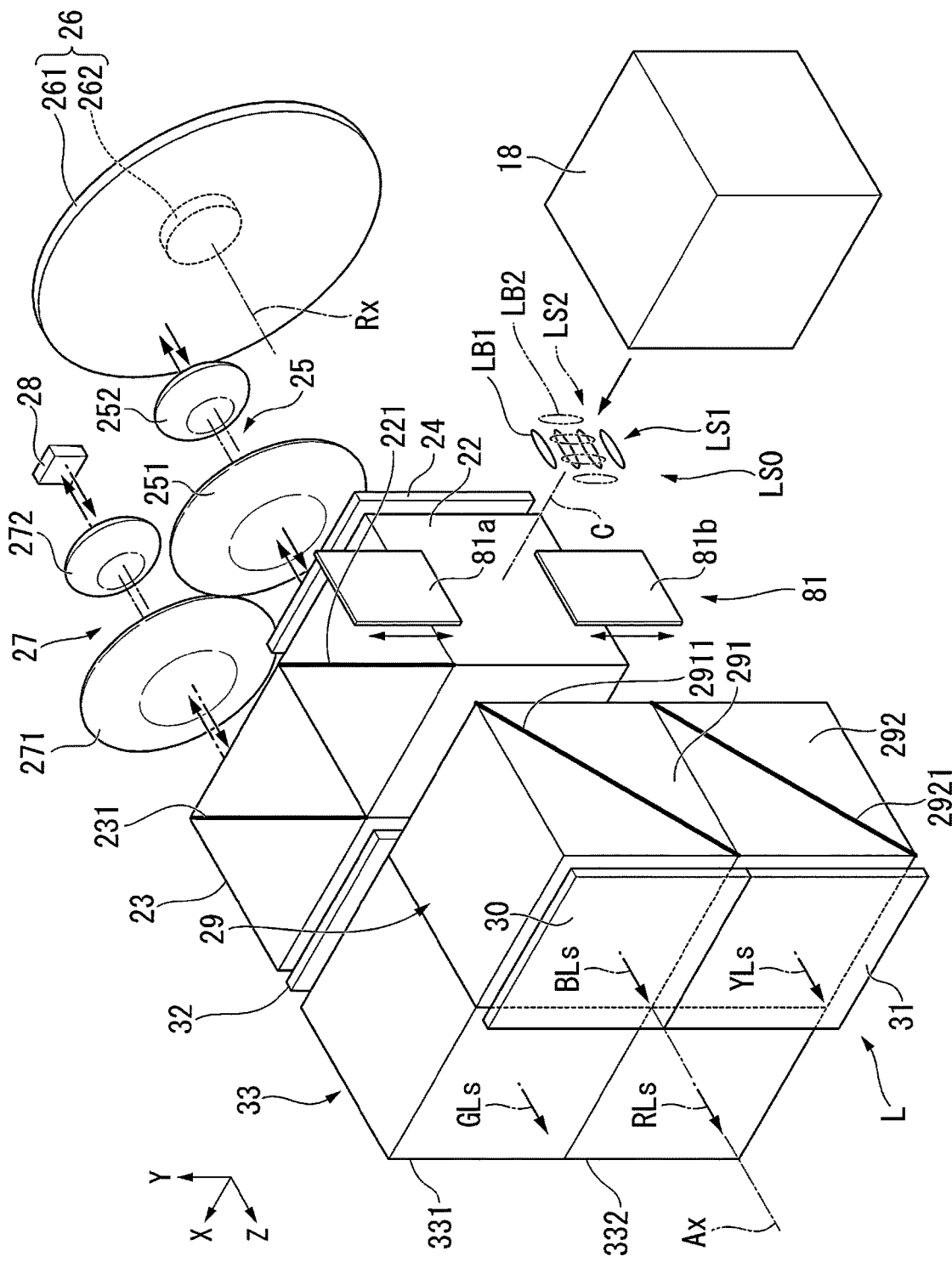
FIG. 9 is a perspective view of the light source apparatus.
Figure 10:
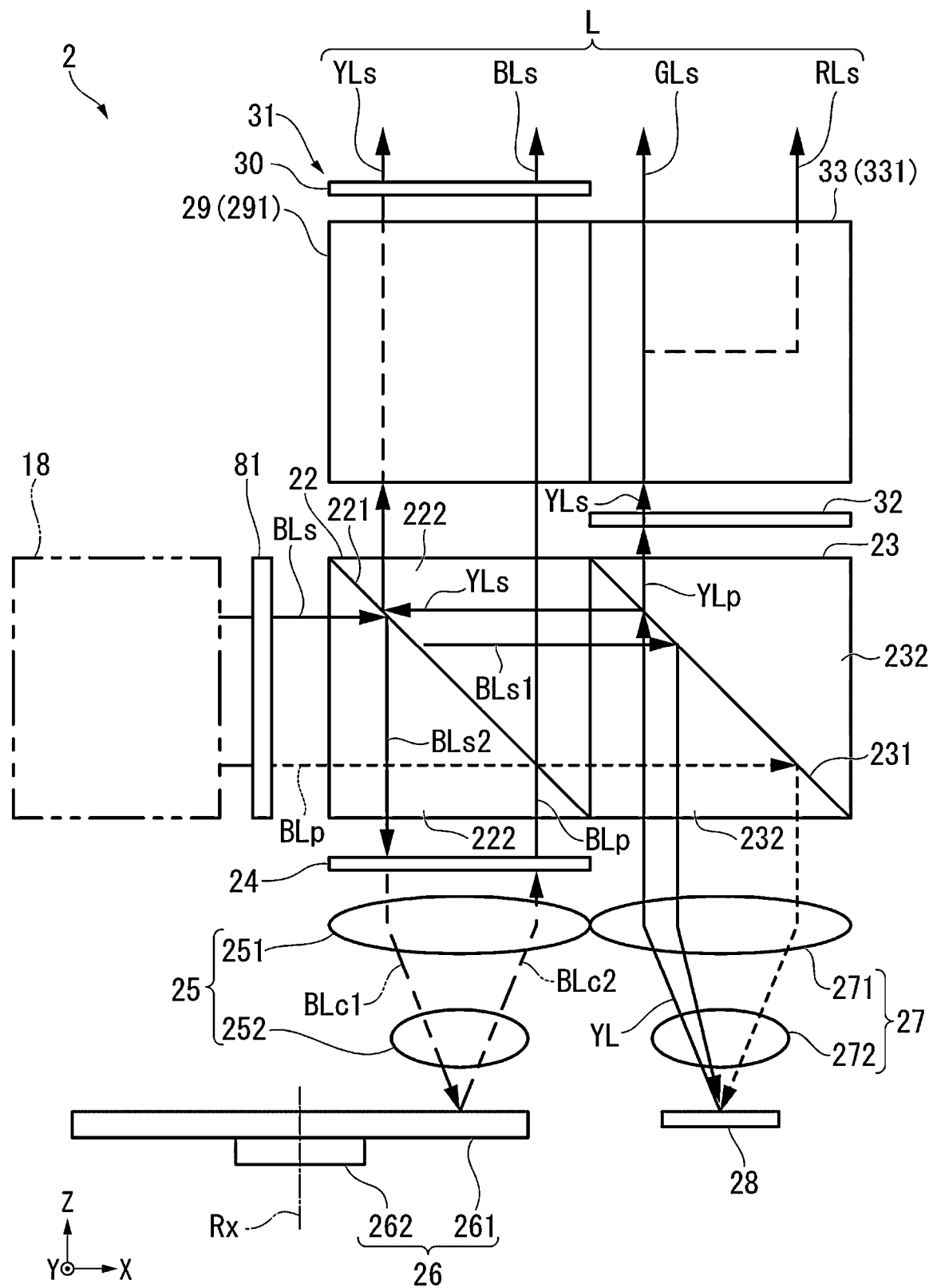
FIG. 10 is a plan view of the light source apparatus viewed in a direction +Y.

FIG. 9 is a perspective view of the light source apparatus 2 according to the present embodiment. FIG. 10 is a plan view of the light source apparatus 2 viewed in the direction +Y.

The light source apparatus 2 outputs the light L, with which the light modulator 6 is illuminated, in the direction parallel to the illumination optical axis Ax, that is, in the direction +Z, as shown in FIGS. 9 and 10. The light L outputted by the light source apparatus 2 is linearly polarized light having an aligned polarization direction and contains a plurality of spatially separated color beams. In the present embodiment, the light L outputted by the light source apparatus 2 is formed of four luminous fluxes each formed of S-polarized light. The four luminous fluxes are blue light BLs, yellow light YLs, green light GLs, and red light RLs.

The light source apparatus 2 includes the light source unit 18, a first phase retarder 81, a first polarization separator 22, a second polarization separator 23, a second phase retarder 24, a first light collector 25, a diffuser 26, a second light collector 27, a wavelength converter 28, a first color separator 29, a fourth phase retarder 30, a reflector 31, a third phase retarder 32, and a second color separator 33.

As will be described later, the first polarization separator 22 and the second polarization separator 23 differ from the first color separator 29 and the second color separator 33 in the orientation of the polarizing component separation film or the orientation of the color beam separation film. The notation of the P-polarized light component and the S-polarized light component is therefore expressed in terms of polarization direction with respect to the first polarization separator 22 and the second polarization separator 23, and the notation is reversed for the first color separator 29 and the second color separator 33. That is, the P polarized light component with respect to the first polarization separator 22 and the second polarization separator 23 is the S polarized light component with respect to the first color separator 29 and the second color separator 33, and the S polarized light component with respect to the first polarization separator 22 and the second polarization separator 23 is the P polarized light component with respect to the first color separator 29 and the second color separator 33. It is, however, noted that the P-polarized light component and the S-polarized light component are hereinafter used as the polarization directions with respect to the first polarization separator 22 and the second polarization separator 23 so as not to cause confusion in the description.

Configuration of Light Source Unit

The light source unit 18 has the same configuration as that in the first embodiment. That is, the light source unit 18 includes the first light source 71, the second light source 72, the plurality of collimator lenses 73, and the polarization combiner 74, as shown in FIG. 3. The light source unit 18 outputs the combined luminous flux LS0, which is the combination of the first luminous flux LS1 from the first light source 71 and the second luminous flux LS2 from the second light source 72. In an imaginary plane perpendicular to the center axis C of the combined luminous flux LS0, the first luminous flux LS1 and the second luminous flux LS2 intersect with each other. That is, the direction (axis-Y direction) in which the four beams LB1 are arranged in a single row and the direction (axis-Z direction) in which the four beams LB2 are arranged in a single row intersect with each other. Part of the first luminous flux LS1 and part of the second luminous flux LS2 overlap with each other.

The axis-Y direction in the present embodiment corresponds to the first direction in the claims. The beams LB1 in the present embodiment correspond to the first beam in the claims. The direction axis-Z in the present embodiment corresponds to the second direction in the claims. The beams LB2 in the present embodiment correspond to the second beam in the claims.

Configuration of First Phase Retarder

The first phase retarder 81 is provided in the optical path of the combined luminous flux LS0 between the polarization combiner 74 of the light source unit 18 and the first polarization separator 22. The first phase retarder 81 is movable so as to be placed in and removed from the optical path of the combined luminous flux LS0. In the present embodiment, the first phase retarder 81 is formed of two retardation films 81a and 81b, as shown in FIG. 9. The two retardation films 81a and 81b are movable along the axis-Y direction independently of each other by a retardation film moving mechanism that is not illustrated. The retardation film moving mechanism is formed, for example, of a stepper motor.

The retardation films 81a and 81b are each formed of a half wave plate for a blue wavelength band. S-polarized light incident on the retardation films 81a and 81b is thus converted into P-polarized light. P-polarized light incident on the retardation films 81a and 81b is converted into S-polarized light. As will be described later, the retardation films 81a and 81b can each be placed in and removed from the optical path of the combined luminous flux LS0 to adjust the ratio of the amount of light to be incident on a diffuser plate 261 and the amount of light to be incident on the wavelength converter 28.

Configuration of First Polarization Separator

The combined luminous flux LS0 containing the S-polarized blue light BLs and the P-polarized blue light BLp enters the first polarization separator 22 along the direction +X, as shown in FIG. 10. The first polarization separator 22 is formed of a prism-shaped polarization separator. The first polarization separator 22 includes a first polarization separation layer 221 and two first bases 222 provided so as to sandwich the first polarization separation layer 221. Specifically, the two first bases 222 each have a substantially right-angled isosceles triangular columnar shape. The two first bases 222 are so combined with each other that the inclining surfaces thereof face each other into a substantially box shape as a whole. The first polarization separation layer 221 is provided between the inclining surfaces of the two first bases 222. The first polarization separation layer 221 therefore inclines by 45° with respect to the axes X and Z. In other words, the first polarization separation layer 221 inclines by 45° with respect to the planes XY and YZ.

The first polarization separation layer 221 has a polarization separation characteristic that causes the first polarization separation layer 221 to transmit P-polarized light, transmit part of S-polarized light, and reflect the other part of the S polarized light out of the light incident on the first polarization separation layer 221. Furthermore, the first polarization separation layer 221 has a wavelength-selective polarization separation characteristic that causes the first polarization separation layer 221 to reflect light having a wavelength band formed of wavelengths longer than those in the blue wavelength band regardless of the polarization state of the light. The first polarization separator 22 therefore transmits along the direction +X the blue light BLp formed of the P-polarized light component out of the blue light incident on first polarization separator 22 the along the direction +X. The first polarization separator 22 transmits along the direction +X blue light BLs1, which is part of the blue light BLs formed of the S-polarized light component incident on the first polarization separator 22 along the direction +X, and reflects in the direction −Z blue light BLs2, which is the other part of the incident light. The first polarization separation layer 221 is formed, for example, of a dielectric multilayer film. The first polarization separation layer 221 of the first polarization separator 22 has an S-polarized light transmittance greater than or equal to 30% but smaller than or equal to 60%.

The blue light BLs in the present embodiment corresponds to the first luminous flux in the claims. The blue light BLp in the present embodiment corresponds to the second luminous flux in the claims.

Configuration of Second Polarization Separator

The second polarization separator 23 is disposed in a position shifted in the direction +X from the first polarization separator 22. The second polarization separator 23 receives the blue light BLp formed of the P polarized light component having passed through the first polarization separator 22 and the blue light BLs1 formed of the S polarized light component, which is part of the blue light BLs and has passed through the first polarization separator 22. The second polarization separator 23 is formed of a prism-shaped polarization separator, as the first polarization separator 22 is. The second polarization separator 23 includes a second polarization separation layer 231 and two second bases 232 provided so as to sandwich the second polarization separation layer 231.

Specifically, the two second bases 232 each have a substantially right-angled isosceles triangular columnar shape. The two second bases 232 are so combined with each other that the inclining surfaces thereof face each other into a substantially box shape as a whole. The second polarization separation layer 231 is provided between the inclining surfaces of the two second bases 232. The second polarization separation layer 231 inclines by 45° with respect to the axes X and Z. In other words, the second polarization separation layer 231 inclines by 45° with respect to the planes XY and YZ. The second polarization separation layer 231 and the first polarization separation layer 221 are disposed in parallel to each other.

The second polarization separation layer 231 has a wavelength-selective polarization separation characteristic that causes the second polarization separation layer 231 to reflect blue light and behave for light having a wavelength band formed of wavelengths longer than those in the blue wavelength band in such a way that the second polarization separation layer 231 reflects S-polarized light and transmits P-polarized light. The second polarization separator 23 therefore reflects in the direction −Z the blue light BLp formed of the P-polarized light component incident from the first polarization separator 22. The second polarization separator 23 further reflects in the direction −Z the blue light BLs1 formed of the S polarized light component, which is part of the blue light BLs and incident from the first polarization separator 22. The blue light BLp and the blue light BLs1 reflected in the −Z direction off the second polarization separator 23 enter the wavelength converter 28 via the second light collector 27. The second polarization separation layer 231 is formed, for example, of a dielectric multilayer film.

In the present embodiment, the first polarization separator 22 and the second polarization separator 23 are configured as separate members. Therefore, although not illustrated, the first polarization separator 22 and the second polarization separator 23 are joined to each other via a bonding material provided between the opposing surfaces of the separators. The first polarization separator 22 and the second polarization separator 23 may instead be integrated with each other into a single unit. That is, the first base 222 adjacent to the second polarization separator 23 and the second base 232 adjacent to the first polarization separator 22 may be a single member made of a single material.

Configuration of Second Phase Retarder

The second phase retarder 24 is disposed in a position shifted in the direction −Z from the first polarization separator 22. That is, the second phase retarder 24 is disposed on the axis Z between the first polarization separator 22 and the diffuser 26. The second phase retarder 24 receives the blue light BLs having exited out of the first polarization separator 22 and the blue light BLc1 diffused by the diffuser plate 261. The second phase retarder 24 is formed of a quarter wave plate for the wavelength of the blue light BLs. The blue light BLs formed of the S-polarized light component reflected off the first polarization separator 22 is converted by the second phase retarder 24 into, for example, right-handed circularly polarized blue light BLc1, which then exits toward the first light collector 25. That is, the second phase retarder 24 converts the polarization state of the blue light BLs incident thereon.

Configuration of First Light Collector

The first light collector 25 is disposed in a position shifted in the direction −Z from the second phase retarder 24. That is, the first light collector 25 is disposed on the axis Z between the second phase retarder 24 and the diffuser 26. The first light collector 25 focuses the blue light BLc1 incident from the second phase retarder 24 on the diffuser plate 261 of the diffuser 26. Furthermore, the first light collector 25 parallelizes the blue light BLc2 to be described later, which is incident from the diffuser 26. In the example shown in FIG. 10, the first light collector 25 is formed of a first lens 251 and a second lens 252, but the number of lenses that form the first light collector 25 is not limited to a specific number.

Configuration of Diffuser

The diffuser 26 is disposed in a position shifted in the direction −Z from the first light collector 25. That is, the diffuser 26 is disposed in a position shifted in the direction −Z from the first polarization separator 22. The diffuser 26 reflects in the direction +Z the blue light BLc1 incident from the first light collector 25 in the direction −Z while diffusing the blue light BLc1 at angles of diffusion comparable to those of the yellow light YL emitted from the wavelength converter 28, which will be described later. The diffuser 26 includes the diffuser plate 261 and a rotator 262. The diffuser plate 261 preferably has a reflection characteristic that achieves closest possible Lambertian scattering and reflects the blue light BLc1 incident on the diffuser plate 261 at wide angles. The rotator 262 is formed, for example, of a motor and rotates the diffuser plate 261 around an axis of rotation Rx, which is parallel to the direction +Z.

The diffuser plate 261 in the present embodiment corresponds to the diffusive reflector in the claims.

The blue light BLc1 incident on the diffuser plate 261 is reflected off the diffuser plate 261 and converted into the blue light BLc2, which is circularly polarized light having a polarization rotation direction opposite the polarization rotation direction of the blue light BLc1 before the conversion. That is, the right-handed circularly polarized blue light BLc1 is converted by the diffuser plate 261 into left-handed circularly polarized blue light BLc2. The blue light BLc2 outputted from the diffuser 26 passes through the first light collector 25 in the direction +Z and is then incident on the second phase retarder 24 again. In this process, the blue light BLc2 incident from the first light collector 25 on the second phase retarder 24 is converted by the second phase retarder 24 into the blue light BLp formed of the P-polarized light component. The converted blue light BLp passes through the first polarization separator 22 in the direction +Z and enters the first color separator 29.

Configuration of Second Light Collector

The second light collector 27 is disposed in a position shifted in the direction −Z from the second polarization separator 23. That is, the second light collector 27 is disposed on the axis Z between the second polarization separator 23 and the wavelength converter 28. The second light collector 27 focuses the blue light BLp and the blue light BLs1 reflected off the second polarization separator 23 on the wavelength converter 28. Furthermore, the second light collector 27 parallelizes the yellow light YL to be described later, which is emitted from the wavelength converter 28, and directs the parallelized yellow light YL toward the second polarization separator 23. In the example shown in FIG. 10, the second light collector 27 is formed of a first lens 271 and a second lens 272, but the number of lenses that form the second light collector 27 is not limited to a specific number.

Configuration of Wavelength Converter

The wavelength converter 28 is disposed in a position shifted in the direction −Z from the second light collector 27. That is, the wavelength converter 28 is disposed in a position shifted in the direction −Z from the second polarization separator 23. The wavelength converter 28 is a reflective wavelength converter that is excited by light incident thereon and emits light having a wavelength different from the wavelength of the incident light in a direction opposite the direction of the incident light. In other words, the wavelength converter 28 converts the light incident thereon in terms of wavelength and emits the light having the converted wavelength in the direction opposite the direction of the incident light.

In the present embodiment, the wavelength converter 28 contains a yellow phosphor that is excited by blue light and emits yellow light. Specifically, the wavelength converter 28 contains, for example, an yttrium-aluminum-garnet-based (YAG-based) phosphor containing cerium (Ce) as an activator. The wavelength converter 28 emits fluorescence having a yellow wavelength band formed of wavelengths longer than those in the blue wavelength band of the blue light BLp and the blue light BLs1 incident along the direction −Z, that is, the unpolarized yellow light YL in the direction +Z. The yellow light YL has a wavelength band ranging, for example, from 500 to 700 nm. The yellow light YL contains green and red light components and is a mixture of S-polarized light and P-polarized light in each of the color light components.

The fluorescence having the yellow wavelength band in the present embodiment, that is, the unpolarized yellow light YL corresponds to the third luminous flux having the second wavelength band in the claims.

The yellow light YL emitted from the wavelength converter 28 passes along the direction +Z through the second light collector 27, which parallelizes the yellow light YL, and the parallelized yellow light YL then enters the second polarization separator 23. The wavelength converter 28 in the present embodiment is a fixed wavelength converter and may be replaced with a rotary wavelength converter including a rotator that rotates the wavelength converter 28 around an axis of rotation parallel to the axis Z. In this case, an increase in the temperature of the wavelength converter 28 can be suppressed, whereby the wavelength conversion efficiency can be increased.

The second polarization separation layer 231 of the second polarization separator 23 has the wavelength-selective polarization separation characteristic for light having the yellow wavelength band, as described above. Therefore, out of the unpolarized yellow light YL incident on the second polarization separation layer 231, the yellow light YLs formed of the S-polarized light component is reflected off the second polarization separation layer 231 in the direction −X and then enters the first polarization separator 22. The first polarization separation layer 221 of the first polarization separator 22 is characterized so as to reflect the yellow light YLs regardless of the polarization state thereof, as described above. The yellow light YLs incident along the direction −X on the first polarization separation layer 221 is therefore reflected in the direction +Z off the first polarization separator 22 and enters the first color separator 29.

The yellow light YLs formed of the S-polarized light component in the present embodiment corresponds to the fifth luminous flux polarized in the fourth polarization direction in the claims.

On the other hand, out of the unpolarized yellow light YL incident on the second polarization separation layer 231, yellow light YLp formed of the P-polarized light component passes through the second polarization separation layer 231 in the direction +Z, exits out of the second polarization separator 23, and enters the third phase retarder 32.

The yellow light YLp formed of the P-polarized light component in the present embodiment corresponds to the fourth luminous flux polarized in the third polarization direction in the claims.

Configuration of First Color Separator

Figure 11:
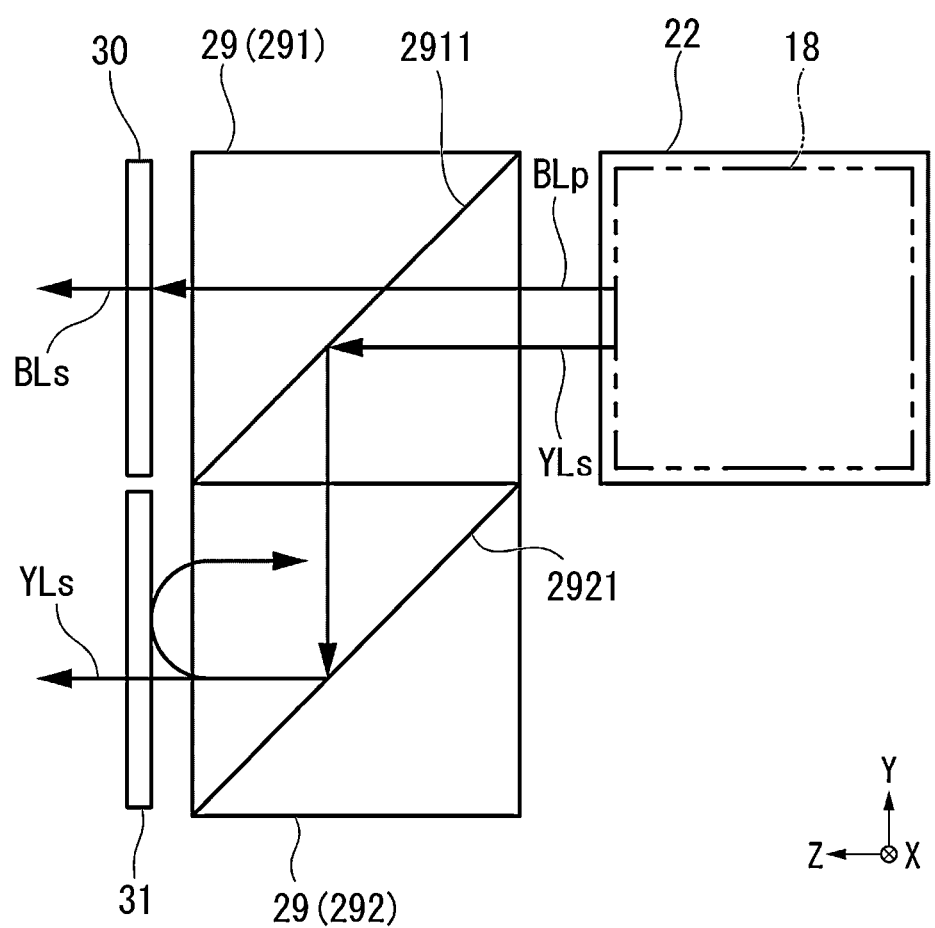
FIG. 11 is a side view of the light source apparatus viewed in a direction −X.

FIG. 11 is a side view of the light source apparatus 2 viewed in the direction −X. That is, FIG. 11 shows the first color separator 29, the fourth phase retarder 30, the reflector 31, and other components viewed in the direction −X. In FIG. 11, the second phase retarder 24, the first light collector 25, and the diffuser 26, and other components are omitted for ease of illustration.

The first color separator 29 is disposed in a position shifted in the direction +Z from the first polarization separator 22, as shown in FIG. 11. The first color separator 29 includes a dichroic prism 291 and a reflection prism 292. The dichroic prism 291 and the reflection prism 292 are arranged side by side along the axis Y. The first color separator 29 separates the light having exited out of the first polarization separator 22 in the direction +Z into the blue light BLp and the yellow light YLs.

The light containing the blue light BLp and the yellow light YLs having exited out of the first polarization separator 22 enters the dichroic prism 291. The dichroic prism 291 is formed of a prism-shaped color separator that is the combination of two bases each having a substantially right-angled isosceles triangular columnar shape and has a substantially box shape. A color separation layer 2911 is provided at the interface between the two bases. The color separation layer 2911 inclines by 45° with respect to the axes Y and Z. In other words, the color separation layer 2911 inclines by 45° with respect to the planes XY and YZ.

The color separation layer 2911 functions as a dichroic mirror that transmits blue light and reflects color light having a wavelength band formed of wavelengths longer than those in the blue wavelength band, that is, yellow light, out of the light incident on the color separation layer 2911. Therefore, out of the light having entered the dichroic prism 291 from the first polarization separator 22, the blue light BLp passes through the color separation layer 2911 in the direction +Z and exits out of the dichroic prism 291.

On the other hand, out of the light having entered the dichroic prism 291 from the first polarization separator 22, the yellow light YLs is reflected off the color separation layer 2911 in the direction −Y. The dichroic prism 291 may be replaced with a dichroic mirror including the color separation layer 2911. The first color separator 29 may be formed of the reflection prism 292 and a polarization separator including a polarization separation layer. Even when the first color separator 29 employs, for example, a polarization separator that transmits the incident blue light BLp in the direction +Z and reflects the yellow light YLs in the direction −Y toward the reflection prism 292 in place of the dichroic prism 291, the polarization separator can separate the blue light BLp and the yellow light YLs from each other as the first color separator 29 including the dichroic prism 291 can.

The reflection prism 292 is disposed in a position shifted in the direction −Y from the dichroic prism 291. The yellow light YLs reflected off the color separation layer 2911 enters the reflection prism 292. The reflection prism 292 is a prism-shaped reflector that is the combination of two bases each having a substantially right-angled isosceles triangular columnar shape each other into a substantially box shape. A reflection layer 2921 is provided at the interface between the two bases. The reflection layer 2921 inclines by 45° with respect to the directions +Y and +Z. In other words, the reflection layer 2921 inclines by 45° with respect to the planes XY and YZ. That is, the reflection layer 2921 and the color separation layer 2911 are disposed in parallel to each other.

The reflection layer 2921 reflects in the direction +Z the yellow light YLs incident from the dichroic prism 291 in the direction −Y. The yellow light YLs reflected off the reflection layer 2921 exits in the direction +Z out of the reflection prism 292. The reflection prism 292 may be replaced with a reflection mirror including the reflection layer 2921.

Configuration of Fourth Phase Retarder

The fourth phase retarder 30 is disposed in a position shifted in the direction +Z from the dichroic prism 291. In other words, the fourth phase retarder 30 is located in the optical path of the blue light BLp having exited out of the dichroic prism 291. The fourth phase retarder 30 is formed of a half wave plate for the blue wavelength band of the blue light BLp incident on the fourth phase retarder 30. The fourth phase retarder 30 converts the blue light BLp incident from the dichroic prism 291 into the blue light BLs formed of the S-polarized light component. The blue light BLs formed of the S-polarized light component resulting from the conversion performed by the fourth phase retarder 30 is outputted in the direction +Z from the light source apparatus 2 and enters the homogenizer 4 shown in FIG. 8. The fourth phase retarder 30 may be so provided as to be in contact with the surface, of the dichroic prism 291, via which the blue light BLp exits.

Configuration of Reflector

The reflector 31 is disposed in a position shifted in the direction +Z from the reflection prism 292. In other words, the reflector 31 is disposed in the optical path of the yellow light YLs having exited out of the reflection prism 292. The reflector 31 is formed of a half-silvered mirror that transmits part of the light incident thereon and reflects the other part of the light. It is, however, noted that the transmittance and reflectance of the half-silvered mirror may be arbitrarily set in accordance with the white balance of the light L outputted from the light source apparatus 2. For example, the transmittance is set at 80%, and the reflectance is set at 20%.

Therefore, part of the yellow light YLs incident on the reflector 31 passes through the reflector 31, exits out of the light source apparatus 2 in the direction +Z, and enters the homogenizer 4. That is, the yellow light YLs is spatially separated from the blue light BLs, exits via a light exiting position different from the light exiting position via which the blue light BLs exits out of the light source apparatus 2, and enters the homogenizer 4. In detail, the yellow light YLs exits via a light exiting position separate in the direction −Y from the light exiting position via which the blue light BLs exits out of the light source apparatus 2 and enters the homogenizer 4.

On the other hand, the other part of the yellow light YLs incident on the reflector 31 is reflected off the reflector 31 and enters again the reflection prism 292. The other part of the yellow light YLs having entered the reflection prism 292 is reflected in the direction +Y off the reflection layer 2921 and enters the wavelength converter 28 via the dichroic prism 291, the first polarization separator 22, the second polarization separator 23, and the second light collector 27.

The yellow phosphor contained in the wavelength converter 28 hardly absorbs yellow light externally incident on the yellow phosphor. The yellow light YLs having entered the wavelength converter 28 is therefore not absorbed by the interior of the wavelength converter 28 and is converted into the unpolarized yellow light YL when repeatedly reflected or scattered. The unpolarized yellow light YL exits again out of the wavelength converter 28 along with the yellow light YL newly generated in the yellow phosphor. The yellow light YL emitted from the wavelength converter 28 enters the second polarization separator 23 via the second light collector 27, as described above. The ratio between the amount of yellow light YLs passing through the reflector 31 and the amount of yellow light YLs reflected off the reflector 31 can be set in advance, as described above. The reflector 31 may be so provided as to be in contact with the surface, of the reflection prism 292, via which the yellow light YLs exits.

Configuration of Second Phase Retarder

Figure 12:
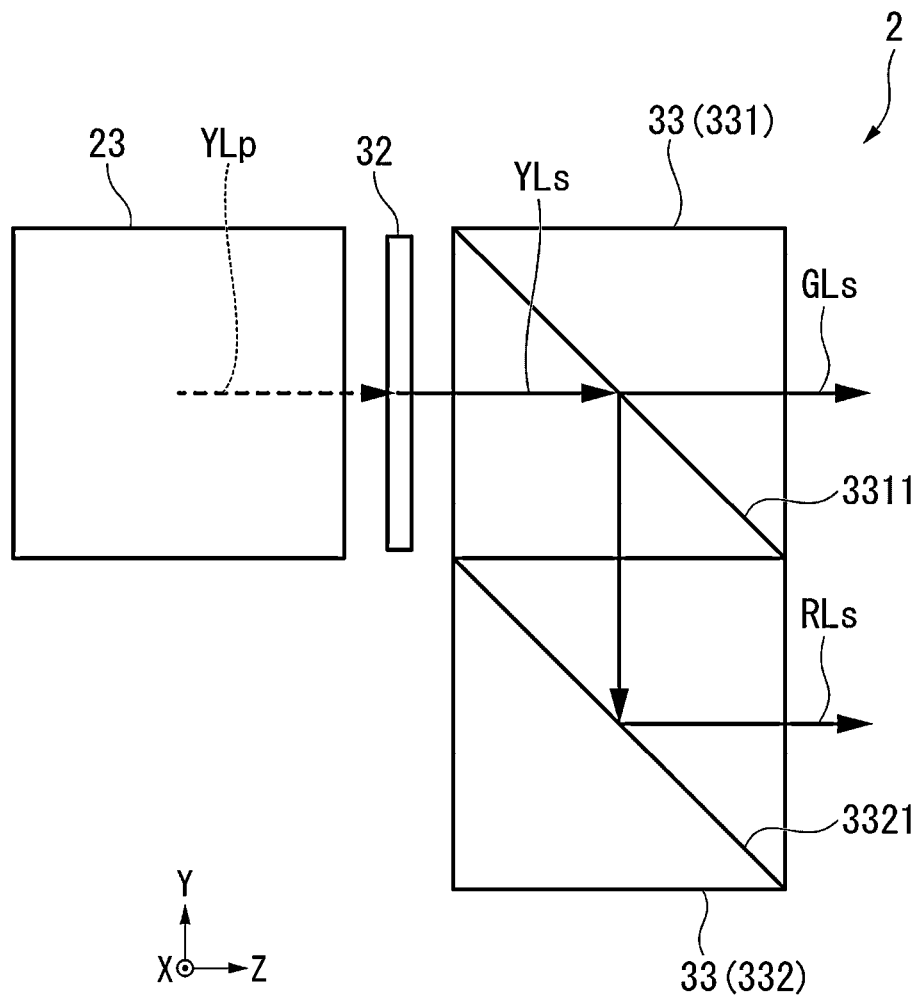
FIG. 12 is a side view of the light source apparatus viewed in a direction +X.

FIG. 12 is a side view of the light source apparatus 2 viewed in the direction +X. In other words, FIG. 12 shows the third phase retarder 32 and the second color separator 33 viewed in the direction +X. In FIG. 12, the second light collector 27 and the wavelength converter 28 are omitted.

The third phase retarder 32 is disposed in a position shifted in the direction +Z from the second polarization separator 23, as shown in FIGS. 10 and 12. The third phase retarder 32 receives the yellow light YLp having passed through the second polarization separator 23. The third phase retarder 32 is formed of a half wave plate for the yellow wavelength band of the yellow light YLp. The third phase retarder 32 converts the yellow light YLp formed of the P-polarized light component into the yellow light YLs formed of the S-polarized light component. The converted yellow light YLs formed of the S-polarized light component enters the second color separator 33.

Configuration of Second Color Separator

The second color separator 33 is disposed in a position shifted in the direction +Z from the third phase retarder 32, as shown in FIG. 12. That is, the second color separator 33 is disposed in a position shifted in the direction +Z from the second polarization separator 23. The second color separator 33 includes a dichroic prism 331 and a reflection prism 332. The dichroic prism 331 and the reflection prism 332 are arranged side by side along the axis Y. The second color separator 33 receives the yellow light YLs having exited in the direction +Z out of the second polarization separator and having been converted into the S-polarized light component by the third phase retarder 32 and separates the yellow light YLs into the green light GLs and the red light RLs.

The green light GLs in the present embodiment corresponds to the sixth luminous flux having the third wavelength band in the claims. The red light RLs in the present embodiment corresponds to the seventh luminous flux having the fourth wavelength band in the claims.

The dichroic prism 331 is formed of a prism-shaped color separator, as the dichroic prism 291 is. A color separation layer 3311 is provided at the interface between the two bases. The color separation layer 3311 inclines by 45° with respect to the directions +Y and +Z. In other words, the color separation layer 3311 inclines by 45° with respect to the planes XY and YZ. The color separation layer 3311 and the reflection layer 3321 are disposed in parallel to each other.

The color separation layer 3311 functions as a dichroic mirror that transmits the green light component in the direction +Z and reflects the red light component in the direction −Y out of the light incident on the color separation layer 3311. Therefore, out of the yellow light YLs having entered the dichroic prism 331, the S-polarized green light GLs passes through the color separation layer 3311 in the direction +Z and exits out of the dichroic prism 331. The S-polarized green light GLs exits in the direction +Z out of the light source apparatus 2 and enters the homogenizer 4. That is, the green light GLs is spatially separated from the blue light BLs and the yellow light YLs, exits via a position different from the positions via which the blue light BLs and the yellow light YLs exit, and enters the homogenizer 4. In other words, the green light GLs exits via a light exiting position separate in the direction +X from the light exiting position via which the blue light BLs exits out of the light source apparatus 2 and enters the homogenizer 4.

On the other hand, out of the yellow light YLs having entered the dichroic prism 331, the red light RLs formed of the S-polarized light component is reflected off the color separation layer 3311 in the direction −Y. The dichroic prism 331 may be replaced with a dichroic mirror including the color separation layer 3311.

The reflection prism 332 has the same configuration as that of the reflection prism 292. That is, the reflection prism 332 includes a reflection layer 3321 parallel to the color separation layer 2911, the color separation layer 3311, and the reflection layer 2921.

The reflection layer 3321 reflects in the direction +Z the red light RLs reflected off the color separation layer 3311 and incident on the reflection layer 3321. The red light RLs reflected off the reflection layer 3321 exits out of the reflection prism 332. The red light RLs exits in the direction +Z out of the light source apparatus 2 and enters the homogenizer 4. That is, the red light RLs is spatially separated from the blue light BLs, the yellow light YLs, and the green light GLs, exits via a position different from the positions via which the blue light BLs, the yellow light YLs, and the green light GLs exit, and enters the homogenizer 4. In other words, the red light RLs exits via a light exiting position separate in the direction −Y from the light exiting position via which the green light GLs exits out of the light source apparatus 2 and separate in the direction +X from the light exiting position via which the yellow light YLs exits out of the light source apparatus 2 and enters the homogenizer 4.

Configuration of Homogenizer

The homogenizer 4 homogenizes the illuminance in an image formation area of the light modulator 6, which is irradiated with the light outputted from the light source apparatus 2, as shown in FIG. 8. The homogenizer 4 includes a first multi-lens 41, a second multi-lens 42, and a superimposing lens 43.

The first multi-lens 41 includes a plurality of lenses 411 arranged in a matrix in a plane perpendicular to the center axis of the light L incident from the light source apparatus 2, that is, the illumination optical axis Ax. The plurality of lenses 411 of the first multi-lens 41 divide the light incident from the light source apparatus 2 into a plurality of sub-luminous fluxes.

Figure 13:
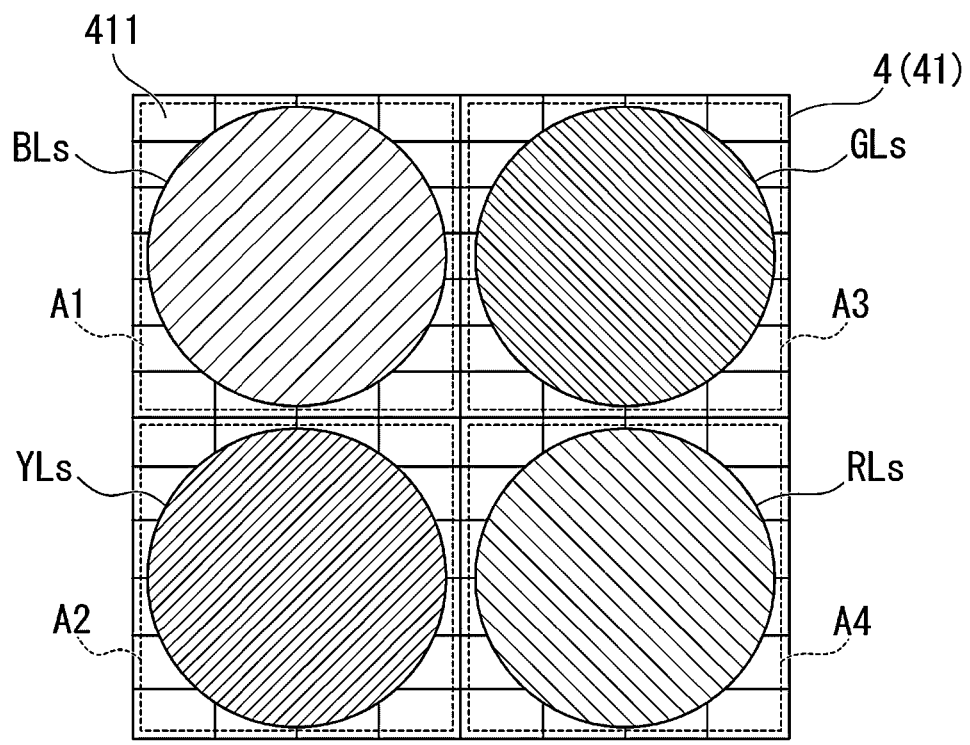
FIG. 13 is a diagrammatic view showing color luminous flux incident positions on a multi-lens.

FIG. 13 is a diagrammatic view showing the color luminous flux incident positions on the first multi-lens 41 viewed in the direction −Z.

The blue light BLs, the yellow light YLs, the green light GLs, and the red light RLs outputted from the light source apparatus 2 enter the first multi-lens 41, as shown in FIG. 13. The blue light BLs having exited out of the light source apparatus 2 via the position shifted in the directions −X and +Y enters a plurality of lenses 411 contained in an area A1, of the first multi-lens 41, shifted in the directions −X and +Y. The yellow light YLs having exited out of the light source apparatus 2 via the position shifted in the directions −X and −Y enters a plurality of lenses 411 contained in an area A2, of the first multi-lens 41, shifted in the directions −X and −Y.

The green light GLs having exited out of the light source apparatus 2 via the position shifted in the directions +X and +Y enters a plurality of lenses 411 contained in an area A3, of the first multi-lens 41, shifted in the directions +X and +Y. The red light RLs having exited out of the light source apparatus 2 via the position shifted in the directions +X and −Y enters a plurality of lenses 411 contained in an area A4, of the first multi-lens 41, shifted in the directions +X and −Y. The color beams having entered the lenses 411 form a plurality of sub-luminous fluxes, which enter lenses 421 of the second multi-lens 42 that correspond to the lenses 411.

Out of the light L outputted from the light source apparatus 2 according to the present embodiment, the blue light BLs corresponds to the first luminous flux in the claims, the yellow light YLs corresponds to the fifth luminous flux in the claims, the green light GLs corresponds to the sixth luminous flux in the claims, and the red light RLs corresponds to the seventh luminous flux in the claims.

The second multi-lens 42 includes a plurality of lenses 421 arranged in a matrix in a plane perpendicular to the illumination optical axis Ax and corresponding to the plurality of lenses 411 of the first multi-lens 41, as shown in FIG. 8. The lenses 421 receive the plurality of sub-luminous fluxes having exited out of the lenses 411 corresponding to the lenses 421. The lenses 421 cause the sub-luminous fluxes incident thereon to enter the superimposing lens 43.

The superimposing lens 43 superimposes the plurality of sub-luminous fluxes incident from the second multi-lens 42 with one another in the image formation area of the light modulator 6. In detail, the second multi-lens 42 and the superimposing lens 43 cause the blue light BLs, the yellow light YLs, the green light GLs, and the red light RLs, each of which has been divided into a plurality of sub-luminous fluxes, to enter via the field lens 5 a plurality of microlenses 621, at different angles, which form a microlens array 62, which will be described later, of the light modulator 6.

Configuration of Light Modulator

The light modulator 6 modulates the light outputted from the light source apparatus 2, as shown in FIG. 8. In detail, the light modulator 6 modulates the color beams outputted from the light source apparatus 2 and incident on the light modulator 6 via the homogenizer 4 and the field lens 5 in accordance with image information to form image light according to the image information. The light modulator 6 includes the single liquid crystal panel 61 and the single microlens array 62.

Configuration of Liquid Crystal Panel

Figure 14:
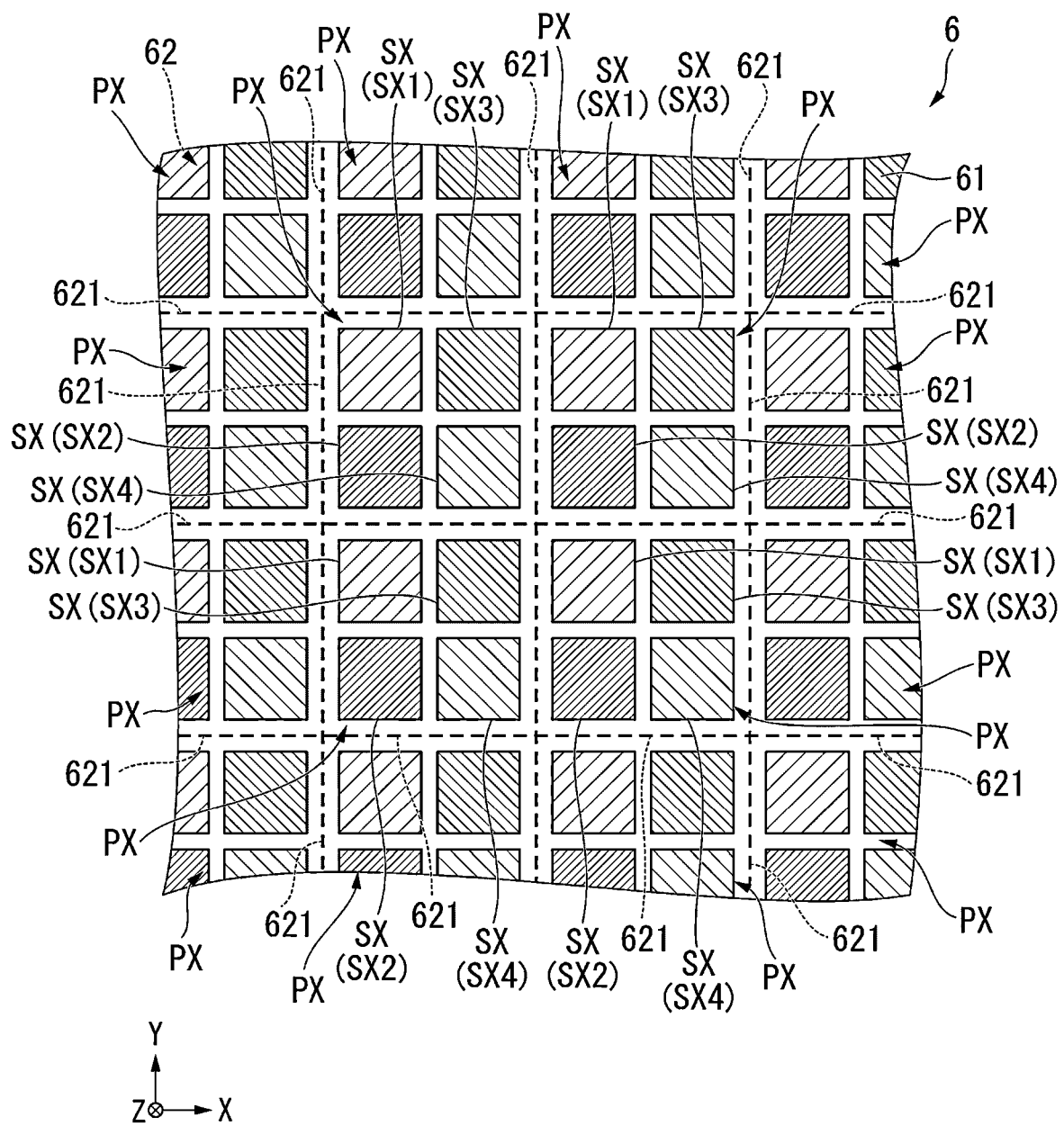
FIG. 14 is an enlarged view of a light modulator.

FIG. 14 is an enlarged diagrammatic view of part of the light modulator 6 viewed in the direction −Z. In other words, FIG. 14 shows the correspondence between pixels PX provided in the liquid crystal panel 61 and the microlenses 621 provided in the microlens array 62.

The liquid crystal panel 61 has a plurality of pixels PX arranged in a matrix in a plane perpendicular to the illumination optical axis Ax, as shown in FIG. 14.

The pixels PX each have a plurality of sub-pixels SX, which modulate color beams having different colors from one another. In the present embodiment, the pixels PX each have four sub-pixels SX (SX1 to SX4). Specifically, in one pixel PX, a first sub-pixel SX1 is disposed in a position shifted in the directions −X and +Y. A second sub-pixel SX2 is disposed in a position shifted in the directions −X and −Y. A third sub-pixel SX3 is disposed in a position shifted in the directions +X and +Y. A fourth sub-pixel SX4 is disposed in a position shifted in the directions +X and −Y.

Configuration of Microlens Array

The microlens array 62 is provided in a position shifted in the direction −Z from or facing the light incident side of the liquid crystal panel 61, as shown in FIG. 8. The microlens array 62 guides the color beams that enter the microlens array 62 to the individual pixels PX. The microlens array 62 includes the plurality of microlenses 621 corresponding to the plurality of pixels PX.

The plurality of microlenses 621 are arranged in a matrix in a plane perpendicular to the illumination optical axis Ax. In other words, the plurality of microlenses 621 are arranged in a matrix in a plane perpendicular to the center axis of the light incident from the field lens 5. In the present embodiment, one microlens 621 is provided in correspondence with two sub-pixels arranged in the direction +X and two sub-pixels arranged in the direction +Y. That is, the microlenses 621 are each provided in correspondence with the four subpixels SX1 to SX4, which are arranged in two rows and two columns in the plane XY.

The blue light BLs, the yellow light YLs, the green light GLs, and the red light RLs superimposed on one another by the homogenizer 4 are incident on each of the microlenses 621 at angles different from one another. The microlenses 621 each cause each of the color beams incident on the microlens 621 to be incident on the sub-pixel SX corresponding to the color beam. Specifically, the microlenses 621 each cause the blue light BLs to be incident on the first sub-pixel SX1, the yellow light YLs to be incident on the second sub-pixel SX2, the green light GLs to be incident on the third sub-pixel SX3, and the red light RLs to be incident on the fourth sub-pixel SX4 out of the sub-pixels SX of the pixel PX corresponding to the microlens 621. The sub-pixels SX1 to SX4 thus receive the color beams corresponding to the sub-pixels SX1 to SX4 and modulate the corresponding color beams. The image light thus modulated by the liquid crystal panel 61 is thus projected by the projection optical apparatus 7 onto the projection receiving surface that is not shown.

In a projector of related art using a lamp as the light source, since the light outputted from the lamp does not have an aligned polarization direction, using a liquid crystal panel as the light modulator requires a polarization conversion section that achieves an aligned polarization direction. The projector typically uses a polarization conversion section including a multi-lens array and a polarization separator (PBS) array. To reduce the size of the projector, a small-interval multi-lens array and a small-interval PBS array are required, but it is very difficult to produce a small-interval PBS array.

To address the problem described above, in the present embodiment, the light source apparatus 2 outputs four color beams having an aligned polarization direction, that is, the blue light BLs formed of the S-polarized light component, the yellow light YLs formed of the S-polarized light component, the green light GLs formed of the S-polarized light component, and the red light RLs formed of the S-polarized light component. According to the configuration described above, a light source apparatus 2 capable of outputting a plurality of color beams spatially separate from one another and having an aligned polarization direction can be achieved without using a small-interval polarization converter, such as that described above. The size of the light source apparatus 2 can thus be reduced, and the size of the projector 1 can in turn be reduced.

The light source apparatus 2 according to the present embodiment, which outputs the combined luminous flux LS0 formed of the first luminous flux LS1 and the second luminous flux LS2 intersecting with each other and partially overlapping with each other, can provide the same effects as those provided in the first embodiment, for example the light diffused by the diffuser plate 261 has a highly symmetrical intensity distribution, whereby white illumination light having only a small degree of color unevenness can be produced.

In the light source apparatus 2 according to the present embodiment, the S-polarized light transmittance of the first polarization separator 22 is greater than or equal to 30% but smaller than or equal to 60%. The light source apparatus 2 further includes the first phase retarder 81, which is provided in the optical path of the combined luminous flux LS0 between the polarization combiner in the light source unit 18 and the first polarization separator 22 and is placeable in and removable from the optical path of the combined luminous flux LS0.

According to the configuration described above, the color balance among the blue light BLs, the yellow light YLs, the red light RLs, and the green light GLs outputted from the light source apparatus 2 can be appropriately adjusted as compared with a case where a first polarization separator that transmits 100% of P-polarized light and reflects 100% of S-polarized light is used.

A specific example will be given below.

Figure 15:
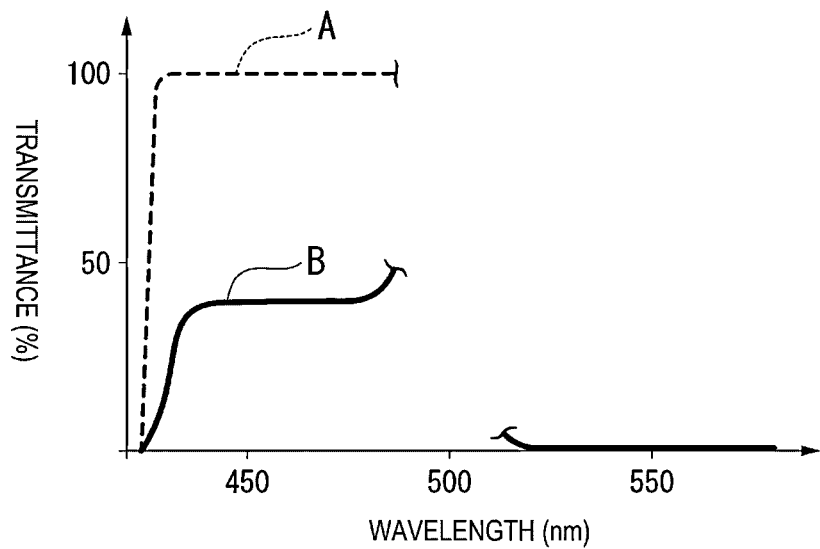
FIG. 15 shows the optical characteristics of a first polarization separator.

FIG. 15 shows the optical characteristics of the first polarization separation layer 221 of the first polarization separator 22. In FIG. 15, the horizontal axis represents the wavelength (nm), and the vertical axis represents the transmittance (%). The solid line shows the characteristics for S-polarized light, and the broken line shows the characteristics for P-polarized light.

The first polarization separation layer 221 transmits about 100% of P-polarized light having the blue wavelength band, as indicated by the graph A in FIG. 15. On the other hand, the S-polarized light transmittance of the first polarization separation layer 221 is set within the range from 30 to 60%, as indicated by the graph B. In the example shown in FIG. 15, the first polarization separation layer 221 transmits 40% of S-polarized light. That is, the first polarization separation layer 221 reflects 60% of S polarized light. In contrast, in the case of light having the yellow wavelength band, the S-polarized light transmittance of the first polarization separation layer 221 is set at about 0%. That is, the first polarization separation layer 221 reflects about 100% of S polarized light having the yellow wavelength band.

Figure 16:
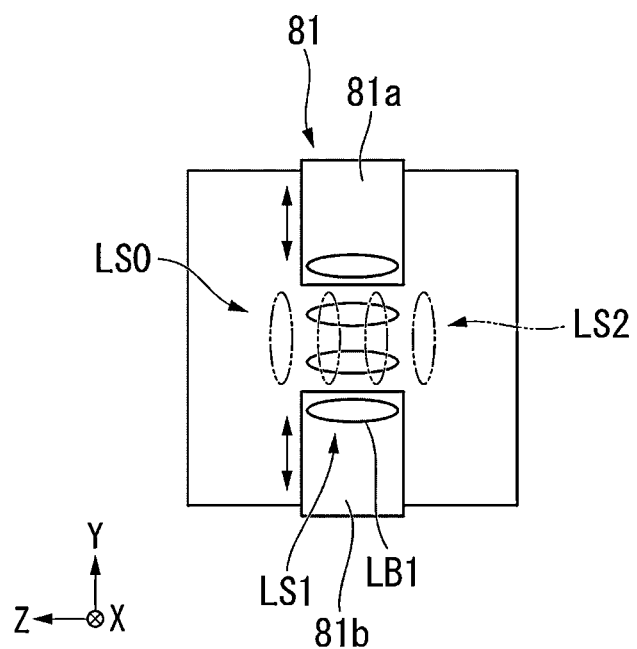
FIG. 16 shows the positional relationship between a first phase retarder and the combined luminous flux.

FIG. 16 shows the positional relationship of the two retardation films 81a and 81b, which form the first phase retarder 81, with the combined luminous flux LS0.

The following three cases are considered, as shown in FIG. 16: (A) a case where the two retardation films 81a and 81b are both located outside the optical path of the combined luminous flux LS0; (B) a case where one of the two retardation films 81a and 81b is located in the optical path of the combined luminous flux LS0, specifically, in one of the four beams BL1, which form the first luminous flux LS1; (C) a case where the two retardation films 81a and 81b are each located in the optical path of the combined luminous flux LS0, and one of the four beams BL1 is located in the optical path of selected one of the four beams BL1.

It is assumed that the transmittance at which the first polarization separation layer 221 transmits S-polarized light having the blue wavelength band is 50%, and that the amount of combined luminous flux LS0 incident on the first polarization separation layer 221 is 100%. In the case of (A), since the ratio between the P-polarized light and the S-polarized light of the combined luminous flux LS0 does not change, the proportions of the P-polarized light and the S-polarized light are both 50%. Therefore, the amount of P-polarized light that passes through the first polarization separation layer 221 is 50%, the amount of S-polarized light that passes through the first polarization separation layer 221 is 25% (50%×0.5), and the amount of S-polarized light reflected off the first polarization separation layer 221 is 25%. As a result, 75% of the light enters the wavelength converter 28, and 25% of the light is incident on the diffuser plate 261.

In the case of (B), one of the four S-polarized beams arranged in the axis-Y direction is converted into P-polarized light by the retardation film 81a, which is one of the retardation films. In this case, the proportions of the P-polarized light and the S-polarized light change from the values in (A), and the ratio of the P-polarized light to the combined luminous flux LS0 is 56.25%, and the ratio of the S-polarized light thereto is 43.75%. As a result, 81.25% of the light is incident on the wavelength converter 28, and 18.750 of the light is incident on the diffuser plate 261 in accordance with the calculation described above.

In the case of (C), two of the four S-polarized beams arranged in the axis-Y direction are each converted into P-polarized light by the two retardation films 81a and 81b. In this case, the proportions of the P-polarized light and the S-polarized light change from the values in (A), and the ratio of the P-polarized light to the combined luminous flux LS0 is 62.5%, and the ratio of the S-polarized light thereto is 37.5%. As a result, 87.5% of the light is incident on the wavelength converter 28, and 12.5% of the light is incident on the diffuser plate 261 in accordance with the calculation described above.

The ratio between the amount of light to be incident on the wavelength converter 28 and the amount of light to be incident on the diffuser plate 261 can be adjusted by changing the S polarized light transmittance of the first polarization separation layer 221 of the first polarization separator 22. Furthermore, the ratio between the amount of light to be incident on the wavelength converter 28 and the amount of light to be incident on the diffuser plate 261 can be adjusted by changing the amounts of light to be incident on the retardation films 81a and 81b, that is, the positions of the retardation films 81a and 81b. According to the configuration described above, the color balance among the blue light BLs, the yellow light YLs, the red light RLs, and the green light GLs outputted from the light source apparatus 2 can be appropriately adjusted.

Effects of Second Embodiment

The light source apparatus 2 according to the present embodiment includes the light source unit 18 in the first embodiment, and in an imaginary plane perpendicular to the center axis C of the combined luminous flux LS0 outputted from the light source unit 18, the direction in which the plurality of beams LB1 are arranged in a single row and the direction in which the plurality of beams LB2 are arranged in a single row intersect with each other, and the first luminous flux LS1 and the second luminous flux LS2 partially overlap with each other, as shown in FIG. 9.

According to the configuration described above, the combined luminous flux LS0 has a highly symmetric intensity distribution, whereby a compact light source apparatus 2 can be achieved. The light source apparatus 2 according to the present embodiment, which includes the diffuser plate 261, which diffuses part of the combined luminous flux LS0, and the wavelength converter 28, which converts the other part of the combined luminous flux LS0 in terms of wavelength, can produce the blue light BLs, the yellow light YLs, the red light RLs, and the green light GLs each having a small degree of color unevenness.

In the present embodiment, the first luminous flux LS1 and the second luminous flux LS2 have the blue wavelength band, and the light source apparatus 2 further includes the first polarization separator 22, which reflects at least part of the blue light BLs outputted from the light source unit 18 and transmits the blue light BLp outputted from the light source unit 18, the diffuser plate 261, which diffuses the blue light BLs having exited out of the first polarization separator 22 and reflects the diffused blue light BLs toward the first polarization separator 22, the second polarization separator 23, which reflects the blue light BLp having passed through the first polarization separator 22, and the wavelength converter 28, which converts the blue light BLp having exited out of the second polarization separator 23 into the fluorescence YL having the yellow wavelength band different from the blue wavelength band. The second polarization separator 23 transmits the yellow light YLp formed of the P-polarized light component out of the fluorescence YL emitted from the wavelength converter 28 and reflects the yellow light YLs formed of the S-polarized light component out of the fluorescence YL emitted from the wavelength converter 28, and the first polarization separator 22 transmits the blue light BLp outputted from the diffuser plate 261 and reflects the yellow light YLs having exited out of the second polarization separator 23.

The configuration described above allows the blue light BLp and the yellow light YLs to exit out of the first polarization separator 22 and the yellow light YLp to exit out of the second polarization separator 23.

In the light source apparatus 2 according to the present embodiment, the blue light BLs is the S-polarized light component with respect to the first polarization separator 22, and the blue light BLp is the P-polarized light component with respect to the first polarization separator 22. The first polarization separator 22 transmits the blue light BLp, reflects part of the blue light BLs, and transmits the other part of the blue light BLs, and the second polarization separator 23 reflects the other part of the blue light BLs having passed through the first polarization separator 22 toward the wavelength converter 28.

The configuration described above, in which the other part of the blue light BLs formed of the S-polarized light component in addition to the blue light BLp formed of the P-polarized light component also enters the wavelength converter 28, allows an increase in the amount of light that excites the phosphor and hence an increase in the amount of fluorescent YL emitted from the wavelength converter 28.

In the light source apparatus 2 according to the present embodiment, the S-polarized light component transmittance of the first polarization separator 22 is greater than or equal to 30% but smaller than or equal to 60%.

According to the configuration described above, appropriate amounts of light can be delivered to the wavelength converter 28 and the diffuser plate 261 as described above, whereby the color balance among the blue light BLs, the yellow light YLs, the red light RLs, and the green light GLs outputted from the light source apparatus 2 can be appropriately adjusted.

The light source apparatus 2 according to the present embodiment further includes the first phase retarder 81, which is provided in the optical path of the combined luminous flux LS0 between the light source unit 18 and the first polarization separator 22 and is placeable in and removable from the optical path of the combined luminous flux LS0.

According to the configuration described above, setting the S-polarized light component transmittance of the first polarization separator 22 at a value greater than or equal to 30% but smaller than or equal to 60% and then placing the first phase retarder 81 in the optical path or removing it therefrom allows adjustment of the ratio of the blue light BLp formed of the P polarization light component and the blue light BLs formed of the S polarization light component in the combined luminous flux LS0 and hence appropriate adjustment of the color balance among the blue light BLs, the yellow light YLs, the red light RLs, and the green light GLs outputted from the light source apparatus 2.

In the light source apparatus 2 according to the present embodiment, the diffuser plate 261 has a diffusion characteristic that allows the full width at half maximum to be greater than or equal to 60°.

According to the configuration described above, the scattering performed by the diffuser plate 261 approaches Lambertian scattering, and the intensity distribution of the diffused light can approach the intensity distribution of the fluorescence YL from the wavelength converter 28. The color unevenness can thus be further suppressed.

The light source apparatus 2 according to the present embodiment further includes the second phase retarder 24, which is provided between the first polarization separator 22 and the diffuser plate 261, on which the blue light BLs2 having exited out of the first polarization separator 22 is incident, and on which the blue light BLc2 diffused by the diffuser plate 261 is incident.

According to the configuration described above, the polarization direction of the blue light BLc2 diffused by the diffuser plate 261 can be converted by the second phase retarder 24, so that the blue light BLc2 can pass through the first polarization separator 22. The blue light BLc2 diffused by the diffuser plate 261 can thus be used more efficiently.

The light source apparatus 2 according to the present embodiment further includes the first color separator 29, which separates the light having exited out of the first polarization separator 22 into the blue light BLs having the blue wavelength band and the yellow light YLs having the yellow wavelength band, and the second color separator 33, which separates the light having exited out of the second polarization separator 23 into the green light GLs having the green wavelength band and the red light RLs having the red wavelength band.

According to the configuration described above, the blue light BLs, the yellow light YLs, the red light RLs, and the green light GLs can exit out of the light source apparatus 2 via four positions different from one another.

The projector 1 according to the present embodiment includes the light source apparatus 2, the light modulator 6, which modulates the light from the light source apparatus 2 in accordance with image information, and the projection optical apparatus 7, which projects the light modulated by the light modulator 6.

According to the configuration described above, a highly efficient, compact projector 1 can be achieved.

The technical scope of the present disclosure is not limited to the embodiments described above, and a variety of changes can be made thereto to the extent that the changes do not depart from the substance of the present disclosure.

For example, the aforementioned embodiments have been described with reference by way of example to the case where the light source apparatus according to an aspect of the present disclosure is used as a light source apparatus including a diffusive reflector and a wavelength converter, and the present disclosure may also be applied to a light source apparatus including no diffusive reflector or wavelength converter. The light source apparatus according to the aspect of the present disclosure is effective in applications in which it is desired to improve the symmetry of the optical intensity distribution in an illumination receiving area even when the light source apparatus includes no diffusive reflector or wavelength converter.

In addition to the above, the specific descriptions of the shape, the number, the arrangement, and other factors of the components of the light source apparatus and the projector are not limited to those in the embodiments described above and can be changed as appropriate.

A light source apparatus according to an aspect of the present disclosure may have the configuration below.

The light source apparatus according to the aspect of the present disclosure includes a first light source that includes a plurality of first light emitters arranged in a single row along a first direction and outputs a first luminous flux containing a plurality of first beams emitted from the plurality of first light emitters, a second light source that includes a plurality of second light emitters arranged in a single row along a second direction that intersects with the first direction and outputs a second luminous flux containing a plurality of second beams emitted from the plurality of second light emitters, and a polarization combiner that combines the first luminous flux and the second luminous flux with each other and outputs a combined luminous flux. The plurality of first beams are arranged in a single row along the first direction in the optical path of the first luminous flux between the first light source and the polarization combiner. The first luminous flux is a luminous flux having a first polarization direction with respect to the polarization combiner. The plurality of second beams are arranged in a single row along the second direction in the optical path of the second luminous flux between the second light source and the polarization combiner. The second luminous flux is a luminous flux having a second polarization direction, different from the first polarization direction, with respect to the polarization combiner. The polarization combiner transmits the first luminous flux having the first polarization direction and reflects the second luminous flux having the second polarization direction. In an imaginary plane perpendicular to the center axis of the combined luminous flux, the direction in which the plurality of first beams are arranged in the single row and the direction in which the plurality of second beams are arranged in the single row intersect with each other, and the first luminous flux and the second luminous flux partially overlap with each other.

In the light source apparatus according to the aspect of the present disclosure, the first luminous flux and the second luminous flux may each have a first wavelength band. The light source apparatus may further include a first polarization separator that reflects at least part of the first luminous flux that exits out of the polarization combiner and transmits the second luminous flux that exits out of the polarization combiner, a diffusive reflector that diffuses the first luminous flux that exits out of the first polarization separator and reflects the diffused first luminous flux toward the first polarization separator, a second polarization separator that reflects the second luminous flux that passes through the first polarization separator, and a wavelength converter that converts the second luminous flux that exits out of the second polarization separator into a third luminous flux having a second wavelength band different from the first wavelength band. The second polarization separator may transmit a fourth luminous flux having a third polarization direction out of the third luminous flux emitted from the wavelength converter and reflect a fifth luminous flux having a fourth polarization direction different from the third polarization direction out of the third luminous flux emitted from the wavelength converter. The first polarization separator may transmit the first luminous flux outputted from the diffusive reflector and reflect the fifth luminous flux that exits out of the second polarization separator.

In the light source apparatus according to the aspect of the present disclosure, the first luminous flux may be S-polarized light with respect to the first polarization separator. The second luminous flux may be P-polarized light with respect to the first polarization separator. The first polarization separator may transmit the second luminous flux, reflect part of the first luminous flux, and transmit the other part of the first luminous flux. The second polarization separator may reflect toward the wavelength converter the other part of the first luminous flux that passes through the first polarization separator.

In the light source apparatus according to the aspect of the present disclosure, the transmittance of the first polarization separator at which the first polarization separator transmits the S-polarized light may be greater than or equal to 30% but smaller than or equal to 60%.

The light source apparatus according to the aspect of the present disclosure may further include a first phase retarder provided in the optical path of the combined luminous flux between the polarization combiner and the first polarization separator and placeable in and removable from the optical path.

In the light source apparatus according to the aspect of the present disclosure, the diffusive reflector may have a diffusion characteristic that allows the half width at full maximum of the diffused light to be greater than or equal to 60°.

The light source apparatus according to the aspect of the present disclosure may further include a second phase retarder provided between the first polarization separator and the diffusive reflector, on which the first luminous flux that exits out of the first polarization separator is incident, and on which the first luminous flux diffused by the diffusive reflector is incident.

The light source apparatus according to the aspect of the present disclosure may further include a first color separator that separates the light that exits out of the first polarization separator into the first luminous flux having the first wavelength band and the fifth luminous flux having the second wavelength band and a second color separator that separates the light that exits out of the second polarization separator into a sixth luminous flux having a third wavelength band different from the second wavelength band and a seventh luminous flux having a fourth wavelength band different from the second wavelength band and the third wavelength band.

A projector according to another aspect of the present disclosure may have the configuration below.

The projector according to the other aspect of the present disclosure includes the light source apparatus according to the aspect of the present disclosure, a light modulator that modulates light from the light source apparatus in accordance with image information, and a projection optical apparatus that projects the light modulated by the light modulator.

What is claimed is:

1. A light source apparatus comprising:
    a first light source that includes a plurality of first light emitters arranged in a single row along a first direction and outputs a first luminous flux containing a plurality of first beams emitted from the plurality of first light emitters;
    a second light source that includes a plurality of second light emitters arranged in a single row along a second direction that intersects with the first direction and outputs a second luminous flux containing a plurality of second beams emitted from the plurality of second light emitters, the first luminous flux and the second luminous flux each having a first wavelength band;
    a polarization combiner that combines the first luminous flux and the second luminous flux with each other and outputs a combined luminous flux;
    a first polarization separator that reflects at least part of the first luminous flux that exits out of the polarization combiner and transmits the second luminous flux that exits out of the polarization combiner;

a diffusive reflector that diffuses the first luminous flux that exits out of the first polarization separator and reflects the diffused first luminous flux toward the first polarization separator;

a second polarization separator that reflects the second luminous flux that passes through the first polarization separator; and a wavelength converter that converts the second luminous flux that exits out of the second polarization separator into a third luminous flux having a second wavelength band different from the first wavelength band, wherein the plurality of first beams are arranged in a single row along the first direction in an optical path of the first luminous flux between the first light source and the polarization combiner, the first luminous flux is a luminous flux having a first polarization direction with respect to the polarization combiner, the plurality of second beams are arranged in a single row along the second direction in an optical path of the second luminous flux between the second light source and the polarization combiner, the second luminous flux is a luminous flux having a second polarization direction, different from the first polarization direction, with respect to the polarization combiner, the polarization combiner transmits the first luminous flux having the first polarization direction and reflects the second luminous flux having the second polarization direction, in an imaginary plane perpendicular to a center axis of the combined luminous flux, a direction in which the plurality of first beams are arranged in the single row and a direction in which the plurality of second beams are arranged in the single row intersect with each other, and the first luminous flux and the second luminous flux partially overlap with each other, the second polarization separator transmits a fourth luminous flux having a third polarization direction out of the third luminous flux emitted from the wavelength converter and reflects a fifth luminous flux having a fourth polarization direction different from the third polarization direction out of the third luminous flux emitted from the wavelength converter, and the first polarization separator transmits the first luminous flux outputted from the diffusive reflector and reflects the fifth luminous flux that exits out of the second polarization separator.

2. The light source apparatus according to claim 1, wherein the first luminous flux is S-polarized light with respect to the first polarization separator, the second luminous flux is P-polarized light with respect to the first polarization separator, the first polarization separator transmits the second luminous flux, reflects part of the first luminous flux, and transmits another part of the first luminous flux, and the second polarization separator reflects toward the wavelength converter the other part of the first luminous flux that passes through the first polarization separator.

3. The light source apparatus according to claim 2, wherein transmittance of the first polarization separator at which the first polarization separator transmits the S-polarized light is greater than or equal to 30% but smaller than or equal to 60%.

4. The light source apparatus according to claim 1, further comprising a first phase retarder provided in an optical path of the combined luminous flux between the polarization combiner and the first polarization separator and placeable in and removable from the optical path.

5. The light source apparatus according to claim 1, wherein the diffusive reflector has a diffusion characteristic that allows a half width at full maximum of the diffused light to be greater than or equal to 60°.

6. The light source apparatus according to claim 1, further comprising a second phase retarder provided between the first polarization separator and the diffusive reflector, on which the first luminous flux that exits out of the first polarization separator is incident, and on which the first luminous flux diffused by the diffusive reflector is incident.

7. The light source apparatus according to claim 1, further comprising:
a first color separator that separates the light that exits out of the first polarization separator into the first luminous flux having the first wavelength band and the fifth luminous flux having the second wavelength band; and
a second color separator that separates the light that exits out of the second polarization separator into a sixth luminous flux having a third wavelength band different from the second wavelength band and a seventh luminous flux having a fourth wavelength band different from the second wavelength band and the third wavelength band.

8. A projector comprising:
the light source apparatus according to claim 1;
a light modulator that modulates light from the light source apparatus in accordance with image information; and
a projection optical apparatus that projects the light modulated by the light modulator.

* * * * *